US012500587B2

(12) United States Patent
Tanaka

(10) Patent No.: US 12,500,587 B2
(45) Date of Patent: Dec. 16, 2025

(54) HIGH-FREQUENCY MODULE AND COMMUNICATION DEVICE

(71) Applicant: Murata Manufacturing Co., Ltd., Nagaokakyo (JP)

(72) Inventor: Rui Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 57 days.

(21) Appl. No.: 18/662,601

(22) Filed: May 13, 2024

(65) Prior Publication Data

US 2024/0297649 A1 Sep. 5, 2024

Related U.S. Application Data

(63) Continuation of application No. PCT/JP2022/044137, filed on Nov. 30, 2022.

(30) Foreign Application Priority Data

Dec. 24, 2021 (JP) ................................ 2021-211581

(51) Int. Cl.
*H03K 17/687* (2006.01)
*H05K 1/02* (2006.01)

(52) U.S. Cl.
CPC ....... *H03K 17/6871* (2013.01); *H05K 1/0243* (2013.01)

(58) Field of Classification Search
CPC .. H03K 17/6871; H05K 1/0243; H01L 25/04; H01L 25/10; H01L 25/18; H04B 1/00; H04B 1/38
See application file for complete search history.

(56) References Cited

FOREIGN PATENT DOCUMENTS

| | | | | | |
|---|---|---|---|---|---|
| CN | 214154504 | U | * | 9/2021 | ........... H04B 1/0067 |
| JP | 2017-037970 | A | | 2/2017 | |
| JP | 2017-208656 | A | | 11/2017 | |
| JP | 2021093607 | A | * | 6/2021 | ............. H04B 1/006 |
| JP | 2021-106341 | A | | 7/2021 | |
| JP | 2021-190847 | A | | 12/2021 | |

OTHER PUBLICATIONS

International Search Report and Written Opinion mailed on Feb. 14, 2023, received for PCT Application PCT/JP2022/044137, filed on Nov. 30, 2022, 9 pages including English Translation.

* cited by examiner

*Primary Examiner* — Metasebia T Retebo
(74) *Attorney, Agent, or Firm* — XSENSUS LLP

(57) ABSTRACT

In a high-frequency module, a plurality of signal paths of a switch circuit include a plurality of switching elements that switch a connection form between a plurality of common terminals and a plurality of selection terminals. At least one signal path among the plurality of signal paths of the switch circuit includes a first wiring pattern portion included in the IC chip, and a second wiring pattern portion included in a mounting board.

19 Claims, 13 Drawing Sheets

HIGH-FREQUENCY MODULE
100
110
3 (3A)
3 (3B)
3 (3C)
3 (3D)
82A
82B
82C
82D
84
84
119
118
111
121
113A
131
117
83A
83B
112
122
113B
132
114
2 (2A)
2 (2B)
2 (2C)
2 (2D)
A32
A11
A1
A66
A34
A39
A3
A25
A30
A40
A53
A7
A41
L32
L11
L1
L66
L34
L39
L3
L25
L30
L40
L53
L7
L41
F30
F25
F66T
F66R
F3T
F3
F32
F1T
F1R
F40
F34
F39
F7
F41R
F41T
F11
F53
7
5
6
161
162
163
81A
81B
81C

HIGH-FREQUENCY MODULE AND COMMUNICATION DEVICE

CROSS-REFERENCE TO RELATED APPLICATIONS

This application is a continuation of international application no. PCT/JP2022/044137, filed Nov. 30, 2022 and which claims priority to Japanese application no. 2021-211581, filed Dec. 24, 2021. The entire contents of both prior applications are hereby incorporated by reference.

TECHNICAL FIELD

The present disclosure generally relates to a high-frequency module and a communication device, and more specifically, to a high-frequency module including a switch circuit and a communication device including the same.

BACKGROUND ART

A conventional front-end architecture (high-frequency module) includes an antenna switch (switch circuit) connected to a plurality of antennas. The front-end architecture can include a carrier aggregation function.

SUMMARY

Technical Problem

In the high-frequency module, for example, in a switch circuit, signal leakage may occur between signal paths different from each other and signal loss may occur.

An exemplary object of the present disclosure is to provide a high-frequency module and a communication device which can reduce signal loss in a switch circuit.

Solution to Problem

A high-frequency module according to one aspect of the present disclosure includes a mounting board and an IC chip. The mounting board has a main surface. The IC chip is disposed on the main surface of the mounting board. The IC chip includes a part of a switch circuit. The switch circuit includes a plurality of common terminals, a plurality of selection terminals, and a plurality of signal paths. The plurality of selection terminals are connectable to the plurality of common terminals. The plurality of signal paths include a plurality of switching elements that switch a connection form between the plurality of common terminals and the plurality of selection terminals. The plurality of common terminals, the plurality of selection terminals, and the plurality of switching elements of the switch circuit are included in the IC chip. At least one signal path among the plurality of signal paths of the switch circuit includes a first wiring pattern portion included in the IC chip, and a second wiring pattern portion included in the mounting board.

According to another aspect of the present disclosure, a communication device includes the high-frequency module according to the above-described aspect, and a signal processing circuit. The signal processing circuit is connected to the high-frequency module.

Advantageous Effects

The high-frequency module and the communication device according to the above-described aspect of the present disclosure can reduce signal loss in the switch circuit.

DESCRIPTION OF EXEMPLARY EMBODIMENTS

Figure 1:
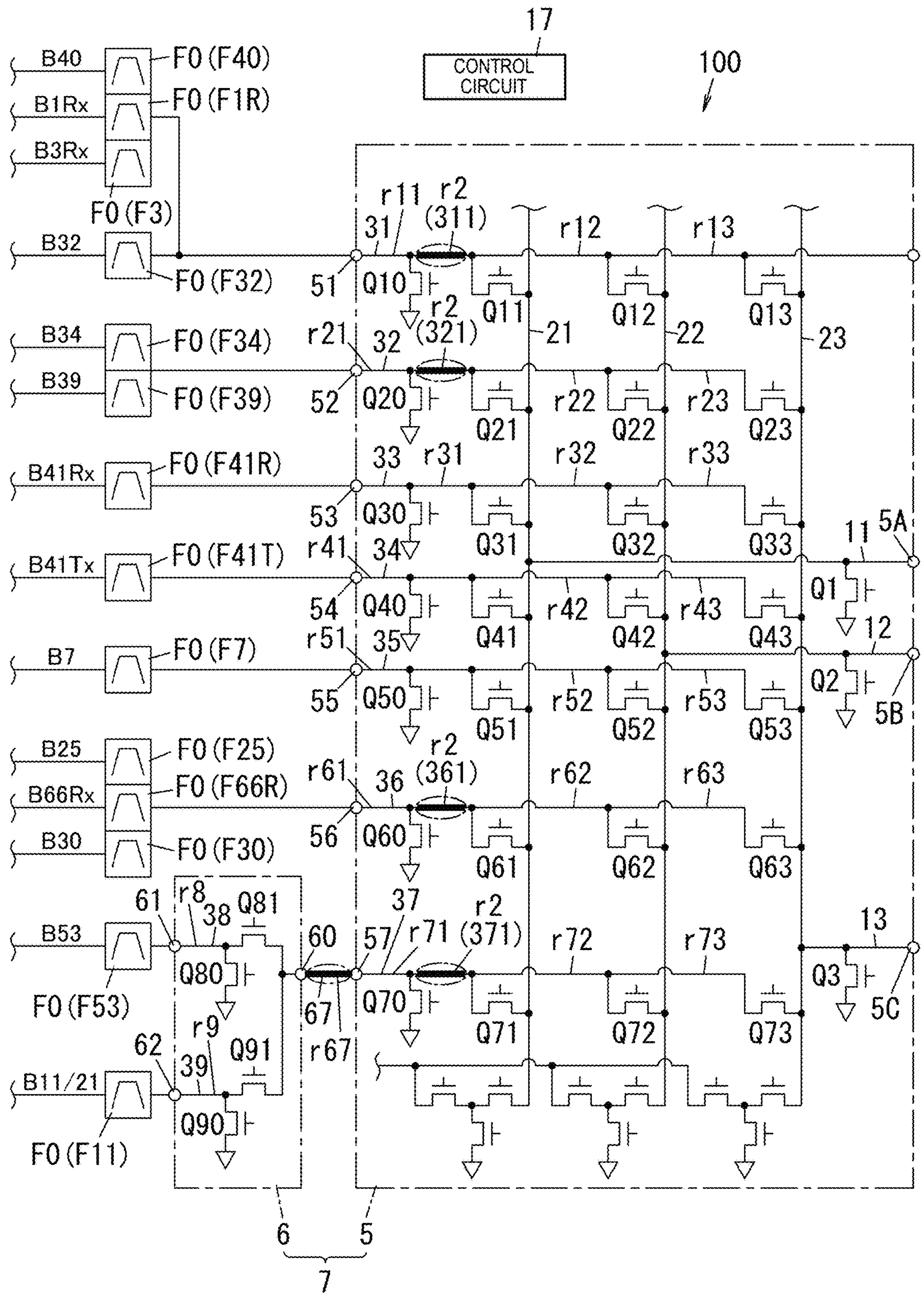
FIG. 1 is a circuit diagram of a switch circuit of a high-frequency module according to an exemplary embodiment.

FIGS. 2 to 4 and 8 to 14, which are referred to in the following exemplary embodiments or the like, are all schematic views, and each of ratios of sizes or thicknesses of each constituent element in the drawing does not necessarily reflect the actual dimensional ratio.

EMBODIMENT

(1) Overview

Figure 2:
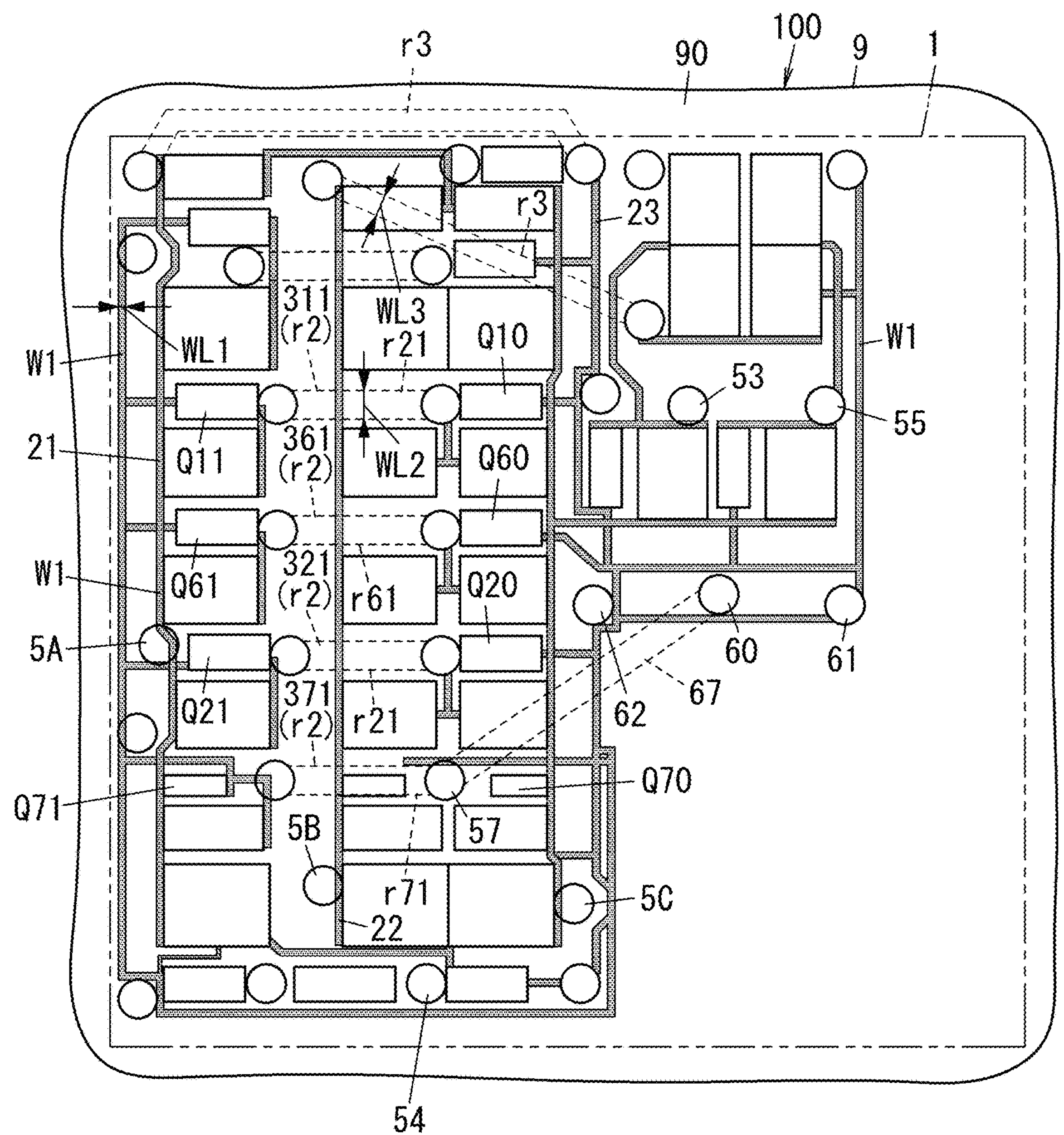
FIG. 2 is a layout explanatory diagram of main portions of the above high-frequency module.
Figure 3:
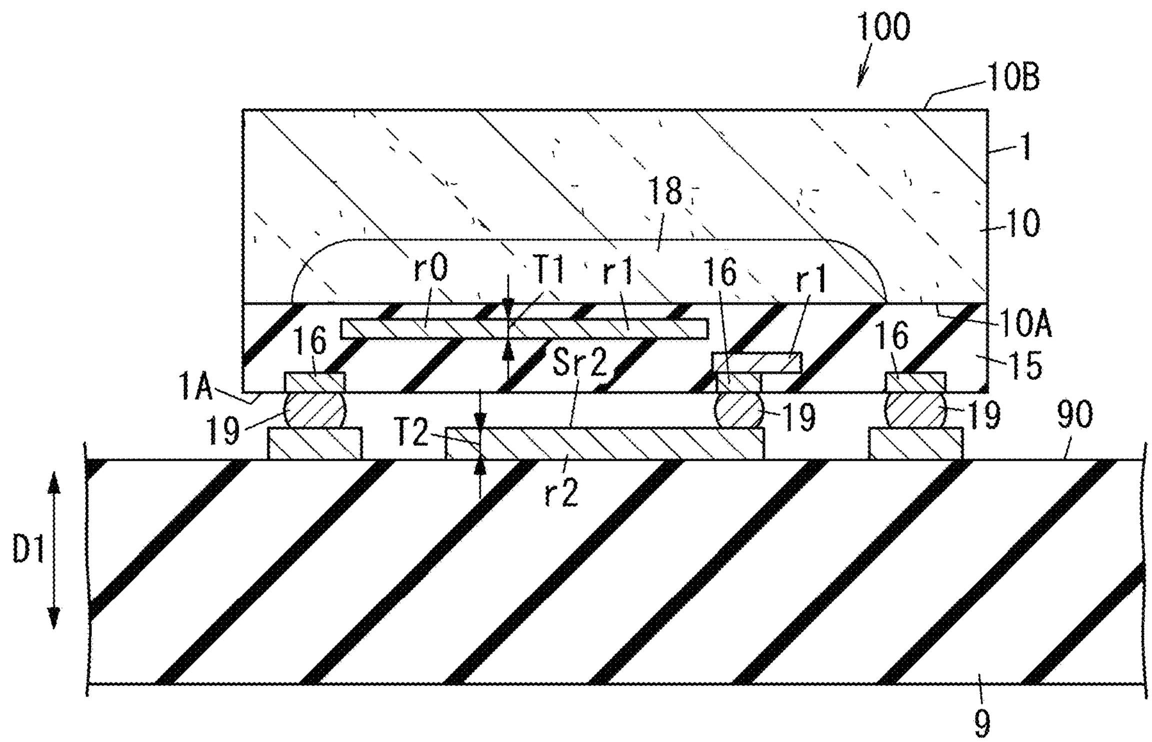
FIG. 3 is a cross-sectional view for describing a first wiring pattern portion and a second wiring pattern portion in the above high-frequency module.

A high-frequency module 100 according to an exemplary embodiment includes a mounting board 9 and an IC chip 1 as shown in FIGS. 2 and 3. The mounting board 9 has a main surface 90. The IC chip 1 is disposed on the main surface 90 of the mounting board 9. The IC chip 1 includes a part of the switch circuit 5 (refer to FIG. 1). The "high-frequency module" as used in the present specification is a module used for communication of high-frequency signals.

As shown in FIG. 1, a switch circuit 5 includes a plurality of (for example, 3) common terminals 5A, 5B, and 5C, a plurality of (for example, 7) selection terminals 51 to 57, and a plurality of (for example, 21) signal paths r11 to r13, r21 to r23, r31 to r33, r41 to r43, r51 to r53, r61 to r63, and r71 to r73. The plurality of selection terminals 51 to 57 are connectable to the plurality of common terminals 5A, 5B, and 5C. The plurality of signal paths r11 to r13, r21 to r23, r31 to r33, r41 to r43, r51 to r53, r61 to r63, and r71 to r73 include a plurality of switching elements Q11 to Q13, Q21 to Q23, Q31 to Q33, Q41 to Q43, Q51 to Q53, Q61 to Q63, and Q71 to Q73 that switches the connection form between the plurality of common terminals 5A, 5B, and 5C and the plurality of selection terminals 51 to 57. Hereinafter, for convenience of the description, the plurality of switching elements Q11 to Q13, Q21 to Q23, Q31 to Q33, Q41 to Q43, Q51 to Q53, Q61 to Q63, and Q71 to Q73 may be referred to as series switching elements without being distinguished from each other. The switch circuit 5 has a plurality of (N×M) signal paths, for example, when the number of common terminals is N and the number of selection terminals is M. In addition, the switch circuit 5 includes a plurality of (N×M) series switching elements corresponding to the plurality of (N×M) signal paths on a one-to-one basis.

The plurality of common terminals 5A, 5B, and 5C, the plurality of selection terminals 51 to 57, and the plurality of switching elements Q11 to Q13, Q21 to Q23, Q31 to Q33, Q41 to Q43, Q51 to Q53, Q61 to Q63, and Q71 to Q73 of the switch circuit 5 are included in the IC chip 1. At least one signal path (hereinafter also referred to as a signal path r0) among the plurality of signal paths r11 to r13, r21 to r23, r31 to r33, r41 to r43, and r51 to r53, r61 to r63, and r71 to r73 of the switch circuit 5 includes a first wiring pattern portion r1 included in the IC chip 1 and a second wiring pattern portion r2 included in the mounting board 9, as shown in FIG. 3. A thickness T2 of the second wiring pattern portion r2 is larger than a thickness T1 of the first wiring pattern portion r1. In FIG. 1, the second wiring pattern portion r2 (hereinafter also referred to as a second wiring pattern portion 311) common to the three signal paths r11, r12, and r13 is indicated by a thicker line than the part corresponding to the first wiring pattern portion r1 of each of the three signal paths r11, r12, and r13, and is surrounded by a dashed line. In addition, in FIG. 1, the second wiring pattern portion r2 (hereinafter also referred to as a second wiring pattern portion 321) common to the three signal paths r21, r22, and r23 is indicated by a thicker line than the part corresponding to the first wiring pattern portion r1 of each of the three signal paths r21, r22, and r23, and is surrounded by a dashed line. In addition, in FIG. 1, the second wiring pattern portion r2 (hereinafter also referred to as a second wiring pattern portion 361) common to the three signal paths r61, r62, and r63 is indicated by a thicker line than the part corresponding to the first wiring pattern portion r1 of each of the three signal paths r61, r62, and r63, and is surrounded by a dashed line. In addition, in FIG. 1, the second wiring pattern portion r2 (hereinafter also referred to as a second wiring pattern portion 371) common to the three signal paths r71, r72, and r73 is indicated by a thicker line than the part corresponding to the first wiring pattern portion r1 of each of the three signal paths r71, r72, and r73, and is surrounded by a dashed line.

The switch circuit 5 further includes a plurality of (7) switching elements Q10, Q20, Q30, Q40, Q50, Q60, and Q70 connected between the plurality of (7) selection terminals 51 to 57 and the ground. Hereinafter, for convenience of the description, the plurality of switching elements Q10, Q20, Q30, Q40, Q50, Q60, and Q70 may be referred to as shunt switching elements without being distinguished from each other. Further, the switch circuit 5 further includes a plurality of (three) switching elements Q1, Q2, and Q3 connected between the plurality of (three) common wiring portions 11, 12, and 13 and the ground.

FIG. 2 is a diagram for describing a schematic layout of some of a plurality of series switching elements of the IC chip 1, some of a plurality of shunt switching elements, some of the plurality of common terminals 5A, 5B, 5C and some of the plurality of selection terminals 51 to 57, and a plurality of second wiring pattern portions 311, 321, 361, and 371 included in the mounting board 9, in plan view in a thickness direction D1 (refer to FIG. 3) of the mounting board 9. In FIG. 2, the outer edge of the IC chip 1 is indicated by a two-dot chain line, each of the plurality of series switching elements and the plurality of shunt switching elements is indicated by a quadrangle, and some of the plurality of common terminals 5A, 5B, and 5C and the plurality of selection terminals 51 to 57 are respectively indicated by a circle, and a plurality of wiring portions W1 in the IC chip 1 are indicated by dot hatching. The plurality of wiring portions W1 in the IC chip 1 shown in FIG. 2 schematically show some wiring portions among all the wiring portions in the IC chip 1, but does not necessarily reflect actual layouts of the wiring portions. Each of the plurality of wiring portions W1 is, for example, a metal wiring portion. The material of each of the plurality of wiring portions W1 is, for example, an aluminum alloy, but is not limited thereto, and may be another alloy or metal. In addition, it is not essential that all wiring portions are metal wiring portions, and the IC chip 1 may include, for example, a polysilicon wiring portion and a diffusion layer wiring portion in addition to the metal wiring portion. In addition, the plurality of wiring portions W1 include at least a part of each of the plurality of signal paths r11 to r13, r21 to r23, r31 to r33, r41 to r43, r51 to r53, r61 to r63, and r71 to r73 of the switch circuit 5 shown in FIG. 1. When the two wiring portions W1 intersect with each other in FIG. 2, a part of the interlayer insulating film included in the IC chip 1 is interposed between the parts of the two wiring portions W1 that intersect with each other. A wiring width WL2 of each of the plurality of second wiring pattern portions r2 is larger than a wiring width WL1 of each of the plurality of wiring portions W1. Therefore, the wiring width WL2 of each of the plurality of second wiring pattern portions 311, 321, 361, and 371 is larger than the wiring width WL1 of the plurality of first wiring pattern portions r1. The wiring width WL2 of each of the plurality of second wiring pattern portions 311, 321, 361, and 371 is, for example, 30μ, but is not limited to 30μ. Further, the wiring widths WL2 of the plurality of second wiring pattern portions 311, 321, 361, and 371 may be different from each other. The material of each of the plurality of second wiring pattern portions r2 is, for example, copper, but is not limited thereto, and may be other metal or alloy.

Figure 4:
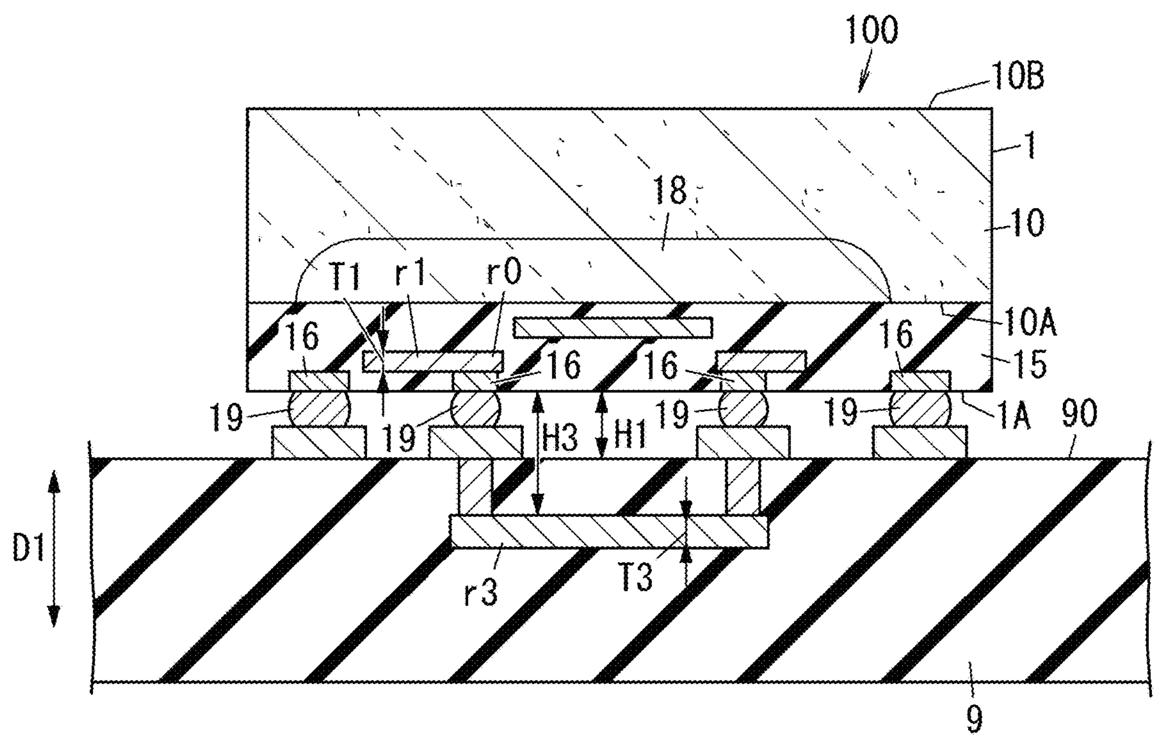
FIG. 4 is a cross-sectional view for describing the first wiring pattern portion and a third wiring pattern portion in the above high-frequency module.

For example, as shown in FIGS. 3 and 4, the IC chip 1 includes a silicon substrate 10, a multilayer structure portion 15 formed on the silicon substrate 10, a circuit portion 18, and a plurality of pad electrodes 16. The plurality of pad electrodes 16 include a plurality of common terminals 5A, 5B, and 5C (refer to FIG. 1) and a plurality of selection terminals 51 to 57 (refer to FIG. 1) in the IC chip 1. The silicon substrate 10 has a first main surface 10A and a second main surface 10B facing each other in the thickness direction of the silicon substrate 10. Here, "facing" means facing geometrically rather than physically. The multilayer structure portion 15 is formed on the first main surface 10A of the silicon substrate 10. The multilayer structure portion 15 includes, for example, a plurality of wiring layers, an interlayer insulating film, and a passivation film. The plurality of wiring layers are formed in a predetermined pattern determined for each wiring layer. The wiring layer may include one or more first wiring pattern portions r1. The circuit portion 18 is formed in the region on the first main surface 10A side in the first main surface 10A and the second main surface 10B in the silicon substrate 10 and in the multilayer structure portion 15. The circuit portion 18 includes the plurality of series switching elements and the plurality of shunt switching elements of the switch circuit 5. Each of the plurality of series switching elements and the plurality of shunt switching elements is, for example, a field effect transistor (FET). Further, the circuit portion 18 includes a plurality of switching elements Q1, Q2, and Q3 of the switch circuit 5. Each of the plurality of switching elements Q1, Q2, and Q3 is, for example, an FET. The plurality of pad electrodes 16 are connected to the circuit portion 18 with the wiring layers and the like of the multilayer structure portion 15 interposed therebetween. In FIG. 3, the first wiring pattern portion r1 included in the IC chip 1 and the second wiring pattern portion r2 included in the mounting board 9 are schematically shown with respect to one signal path r0. The IC chip 1 may include, for example, a silicon on insulator (SOI) substrate instead of the silicon substrate 10.

The IC chip 1 is mounted on the mounting board 9 by bonding the plurality of pad electrodes 16 to the mounting board 9 by conductive bumps 19 corresponding to the plurality of pad electrodes 16 on a one-to-one basis. In addition, in FIG. 3, the plurality of pad electrodes 16 have a structure that is embedded in the multilayer structure portion 15, but the present disclosure is not limited to such a structure, and may be formed on the main surface opposite to the silicon substrate 10 side in the multilayer structure portion 15.

Figure 5:
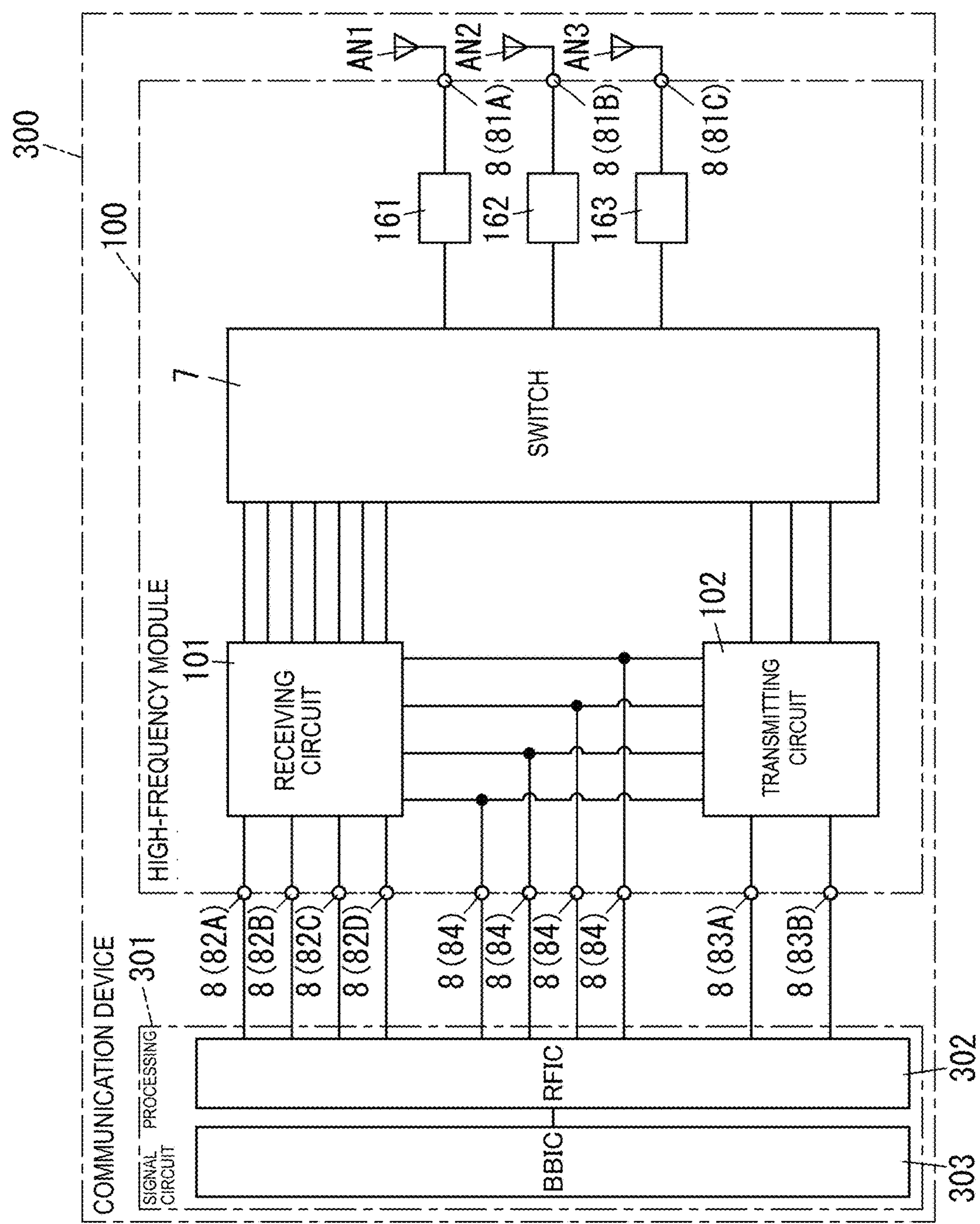
FIG. 5 is a circuit diagram of a communication device including the above high-frequency module.

The high-frequency module 100 is used, for example, in a communication device 300 as shown in FIG. 5. The communication device 300 is, for example, a mobile phone (for example, a smartphone), but is not limited thereto, and may be, for example, a wearable terminal (for example, a smartwatch), or the like. The high-frequency module 100 is, for example, a module that can support a fourth generation mobile communication (4G) standard or a fifth generation mobile communication (5G) standard. The 4G standard is, for example, a third generation partnership project (3GPP) (registered trademark) long term evolution (LTE) standard (registered trademark). The 5G standard is, for example, 5G new radio (NR). The high-frequency module 100 is, for example, a module capable of supporting carrier aggregation and dual connectivity. Further, the high-frequency module 100 is capable of supporting multi input multi output (MIMO).

(2) Details

Hereinafter, the high-frequency module 100 according to an exemplary embodiment will be described with reference to FIGS. 1 to 9, and the communication device 300 will be described in more detail with reference to FIGS. 5 to 7.

(2.1) High-Frequency Module

(2.1.1) Circuit Configuration of High-Frequency Module

The circuit configuration of the high-frequency module 100 according to the exemplary embodiment will be described with reference to FIG. 1.

For example, as shown in FIG. 1, the switch circuit 5 includes the plurality of (for example, 3) common terminals 5A, 5B, and 5C, the plurality of (for example, 7) selection terminals 51 to 57, and the plurality of (for example, 21) signal paths r11 to r13, r21 to r23, r31 to r33, r41 to r43, r51 to r53, r61 to r63, and r71 to r73.

The plurality of (3) common terminals 5A, 5B, and 5C are connected to a plurality of (3) antenna terminals 81A, 81B, and 81C (refer to FIG. 5) outside the switch circuit 5.

The plurality of selection terminals 51 to 57 are connectable to the plurality of common terminals 5A, 5B, and 5C.

The switch circuit 5 includes the plurality of (3) common wiring portions 11, 12, and 13 connected to the plurality of (3) common terminals 5A, 5B, and 5C on a one-to-one basis, the plurality of (3) first wiring portions 21, 22, and 23 connected to the plurality of (3) common wiring portions 11, 12, and 13 on a one-to-one basis, and a plurality of (7) of second wiring portions 31 to 37 connected to the plurality of (7) of selection terminals 51 to 57 on a one-to-one basis. Further, the switch circuit 5 has the plurality of (3) switching elements Q11, Q12, and Q13 connected between the second wiring portion 31 and the plurality of (3) first wiring portions 21, 22, and 23. Further, the switch circuit 5 has the plurality of (3) switching elements Q21, Q22, and Q23 connected between the second wiring portion 32 and the plurality of (3) first wiring portions 21, 22, and 23. Further, the switch circuit 5 has the plurality of (3) switching elements Q31, Q32, and Q33 connected between the second wiring portion 33 and the plurality of (3) first wiring portions 21, 22, and 23. Further, the switch circuit 5 has the plurality of (3) switching elements Q41, Q42, and Q43 connected between the second wiring portion 34 and the plurality of (3) first wiring portions 21, 22, and 23. Further, the switch circuit 5 has the plurality of (3) switching elements Q51, Q52, and Q53 connected between the second wiring portion 35 and the plurality of (3) first wiring portions 21, 22, and 23. Further, the switch circuit 5 has the plurality of (3) switching elements Q61, Q62, and Q63 connected between the second wiring portion 36 and the plurality of (3) first wiring portions 21, 22, and 23. Further, the switch circuit 5 has the plurality of (3) switching elements Q71, Q72, and Q73 connected between the second wiring portion 37 and the plurality of (3) first wiring portions 21, 22, and 23.

The signal path r11 between the common terminal 5A and the selection terminal 51 includes the common wiring portion 11, a part between the common wiring portion 11 and the switching element Q11 in the first wiring portion 21, and a part between the switching element Q11 and the selection terminal 51 in the second wiring portion 31. The signal path r12 between the common terminal 5B and the selection terminal 51 includes the common wiring portion 12, a part between the common wiring portion 12 and the switching element Q12 in the first wiring portion 22, and a part between the switching element Q12 and the selection terminal 51 in the second wiring portion 31. The signal path r13 between the common terminal 5C and the selection terminal 51 includes the common wiring portion 13, a part between the common wiring portion 13 and the switching element Q13 in the first wiring portion 23, and a part between the switching element Q13 and the selection terminal 51 in the second wiring portion 31.

The signal path r21 between the common terminal 5A and the selection terminal 52 includes the common wiring portion 11, a part between the common wiring portion 11 and the switching element Q21 in the first wiring portion 21, and a part between the switching element Q21 and the selection terminal 52 in the second wiring portion 32. The signal path r22 between the common terminal 5B and the selection terminal 52 includes the common wiring portion 12, a part between the common wiring portion 12 and the switching element Q22 in the first wiring portion 22, and a part between the switching element Q22 and the selection terminal 52 in the second wiring portion 32. The signal path r23 between the common terminal 5C and the selection terminal 52 includes the common wiring portion 13, a part between the common wiring portion 13 and the switching element Q23 in the first wiring portion 23, and a part between the switching element Q23 and the selection terminal 52 in the second wiring portion 32.

The signal path r31 between the common terminal 5A and the selection terminal 53 includes the common wiring portion 11, a part between the common wiring portion 11 and the switching element Q31 in the first wiring portion 21, and a part between the switching element Q31 and the selection terminal 53 in the second wiring portion 33. The signal path r32 between the common terminal 5B and the selection terminal 53 includes the common wiring portion 12, a part between the common wiring portion 12 and the switching element Q32 in the first wiring portion 22, and a part between the switching element Q32 and the selection terminal 53 in the second wiring portion 33. The signal path r33 between the common terminal 5C and the selection terminal 53 includes the common wiring portion 13, a part between the common wiring portion 13 and the switching element Q33 in the first wiring portion 23, and a part between the switching element Q33 and the selection terminal 53 in the second wiring portion 33.

The signal path r41 between the common terminal 5A and the selection terminal 54 includes the common wiring portion 11, a part between the common wiring portion 11 and the switching element Q41 in the first wiring portion 21, and a part between the switching element Q41 and the selection terminal 54 in the second wiring portion 34. The signal path r42 between the common terminal 5B and the selection terminal 54 includes the common wiring portion 12, a part between the common wiring portion 12 and the switching element Q42 in the first wiring portion 22, and a part between the switching element Q42 and the selection terminal 54 in the second wiring portion 34. The signal path r43 between the common terminal 5C and the selection terminal 54 includes the common wiring portion 13, a part between the common wiring portion 13 and the switching element Q43 in the first wiring portion 23, and a part between the switching element Q43 and the selection terminal 54 in the second wiring portion 34.

The signal path r51 between the common terminal 5A and the selection terminal 55 includes the common wiring portion 11, a part between the common wiring portion 11 and the switching element Q51 in the first wiring portion 21, and a part between the switching element Q51 and the selection terminal 55 in the second wiring portion 35. The signal path r52 between the common terminal 5B and the selection terminal 55 includes the common wiring portion 12, a part between the common wiring portion 12 and the switching element Q52 in the first wiring portion 22, and a part between the switching element Q52 and the selection terminal 55 in the second wiring portion 35. The signal path r53 between the common terminal 5C and the selection terminal 55 includes the common wiring portion 13, a part between the common wiring portion 13 and the switching element Q53 in the first wiring portion 23, and a part between the switching element Q53 and the selection terminal 55 in the second wiring portion 35.

The signal path r61 between the common terminal 5A and the selection terminal 56 includes the common wiring portion 11, a part between the common wiring portion 11 and the switching element Q61 in the first wiring portion 21, and a part between the switching element Q61 and the selection terminal 56 in the second wiring portion 36. The signal path r62 between the common terminal 5B and the selection terminal 56 includes the common wiring portion 12, a part between the common wiring portion 12 and the switching element Q62 in the first wiring portion 22, and a part between the switching element Q62 and the selection terminal 56 in the second wiring portion 36. The signal path r63 between the common terminal 5C and the selection terminal 56 includes the common wiring portion 13, a part between the common wiring portion 13 and the switching element Q63 in the first wiring portion 23, and a part between the switching element Q63 and the selection terminal 56 in the second wiring portion 36.

The signal path r71 between the common terminal 5A and the selection terminal 57 includes the common wiring portion 11, a part between the common wiring portion 11 and the switching element Q71 in the first wiring portion 21, and a part between the switching element Q71 and the selection terminal 57 in the second wiring portion 37. The signal path r72 between the common terminal 5B and the selection terminal 57 includes the common wiring portion 12, a part between the common wiring portion 12 and the switching element Q72 in the first wiring portion 22, and a part between the switching element Q72 and the selection terminal 57 in the second wiring portion 37. The signal path r73 between the common terminal 5C and the selection terminal 57 includes the common wiring portion 13, a part between the common wiring portion 13 and the switching element Q73 in the first wiring portion 23, and a part between the switching element Q73 and the selection terminal 57 in the second wiring portion 37.

The switch circuit 5 has a plurality of shunt switching elements (switching elements Q10, Q20, Q30, Q40, Q50, Q60, and Q70) as described above. The switching element Q10 is connected between the part between the selection terminal 51 and the switching element Q11 (the part common to the three signal paths r11 to r13) in the second wiring portion 31 and the ground. The switching element Q20 is connected between the part between the selection terminal 52 and the switching element Q21 (the part common to the three signal paths r21 to r23) in the second wiring portion 32 and the ground. The switching element Q30 is connected between the part between the selection terminal 53 and the switching element Q31 (the part common to the three signal paths r31 to r33) in the second wiring portion 33 and the ground. The switching element Q40 is connected between the part between the selection terminal 54 and the switching element Q41 (the part common to the three signal paths r41 to r43) in the second wiring portion 34 and the ground. The switching element Q50 is connected between the part between the selection terminal 55 and the switching element Q51 (the part common to the three signal paths r51 to r53) in the second wiring portion 35 and the ground. The switching element Q60 is connected between the part between the selection terminal 56 and the switching element Q61 (the part common to the three signal paths r61 to r63) in the second wiring portion 36 and the ground. The switching element Q70 is connected between the part between the selection terminal 57 and the switching element Q71 (the part common to the three signal paths r71 to r73) in the second wiring portion 37 and the ground.

In the high-frequency module 100, as shown in FIG. 1, the IC chip 1 further includes a second switch circuit 6 different from the first switch circuit 5 which is the switch circuit 5. The second switch circuit 6 has a common terminal 60 and a plurality of (for example, 2) selection terminals 61 and 62. The second switch circuit 6 has a signal path r8 between the common terminal 60 and the selection terminal 61 and a signal path r9 between the common terminal 60 and the selection terminal 62. The signal path r8 includes a wiring portion 38 and a switching element Q81. The signal path r9 includes a wiring portion 39 and a switching element Q91. The second switch circuit 6 further includes a switching element Q80 connected between the part between the selection terminal 61 and the switching element Q81 in the wiring portion 38 and the ground. Further, the second switch circuit 6 further includes a switching element Q90 connected between the part between the selection terminal 62 and the switching element Q91 in the wiring portion 39 and the ground.

At least a part of the signal path r67 that connects the selection terminal 57 of the first switch circuit 5 and the common terminal 60 of the second switch circuit 6 includes a wiring pattern portion 67 (refer to FIGS. 1 and 2) in the mounting board 9 (refer to FIG. 2).

The high-frequency module 100 further includes a plurality of (for example, 14) filters F0 as shown in FIG. 1. The plurality of filters F0 have pass bands that are different from each other. The pass bands of the plurality of filters F0 correspond to a plurality of communication bands. Each of the plurality of communication bands is, for example, a communication band used for communication corresponding to frequency division duplex (FDD) as a communication method, or a communication band used for communication corresponding to time division duplex (TDD) or supplemental downlink (SDL). The plurality of communication bands include, for example, Band 40, Band 1, Band 3, Band 32, Band 34, Band 39, Band 41, Band 7, Band 25, Band 66, Band 30, Band 53, Band 11, and Band 21 of the 3GPP LTE standard.

In FIG. 1, "B40" is written on the left side of the graphical symbol of the filter F0 (hereinafter also referred to as a receive filter F40) having a pass band corresponding to the receive band of Band 40 of the 3GPP LTE standard. Similarly, in FIG. 1, "B1Rx" is written on the left side of the graphical symbol of the filter F0 (hereinafter also referred to as a receive filter F1R) having a pass band corresponding to the receive band of Band 1. Similarly, in FIG. 1, "B3Rx" is written on the left side of the graphical symbol of the filter F0 (hereinafter also referred to as a receive filter F3) having a pass band corresponding to the receive band of Band 3. Similarly, in FIG. 1, "B32" is written on the left side of the graphical symbol of the filter F0 (hereinafter also referred to as a receive filter F32) having a pass band corresponding to the receive band of Band 32. Similarly, in FIG. 1, "B34" is written on the left side of the graphical symbol of the filter F0 (hereinafter also referred to as a receive filter F34) having a pass band corresponding to the receive band of Band 34. Similarly, in FIG. 1, "B39" is written on the left side of the graphical symbol of the filter F0 (hereinafter also referred to as a receive filter F39) having a pass band corresponding to the receive band of Band 39. Similarly, in FIG. 1, "B41Rx" is written on the left side of the graphical symbol of the filter F0 (hereinafter also referred to as a receive filter F41R) having a pass band corresponding to the receive band of Band 41. Similarly, in FIG. 1, "B41Tx" is written on the left side of the graphical symbol of the filter F0 (hereinafter also referred to as a transmission filter F41T) having a pass band corresponding to the transmission band of Band 41. Similarly, in FIG. 1, "B7" is written on the left side of the graphical symbol of the filter F0 (hereinafter also referred to as a receive filter F7) having a pass band corresponding to the receive band of Band 7. Similarly, in FIG. 1, "B25" is written on the left side of the graphical symbol of the filter F0 (hereinafter also referred to as a receive filter F25) having a pass band corresponding to the receive band of Band 25. Similarly, in FIG. 1, "B66Rx" is written on the left side of the graphical symbol of the filter F0 (hereinafter also referred to as a receive filter F66R) having a pass band corresponding to the receive band of Band 66. Further, in FIG. 1, "B30" is written on the left side of the graphical symbol of the filter F0 (hereinafter also referred to as a receive filter F30) having a pass band corresponding to the receive band of Band 30. Similarly, in FIG. 1, "B53" is written on the left side of the graphical symbol of the filter F0 (hereinafter also referred to as a receive filter F53) having a pass band corresponding to the receive band of Band 53. Similarly, in FIG. 1, "B11/21" is written on the left side of the graphical symbol of the filter F0 (hereinafter also referred to as a receive filter F11) having a pass band corresponding to the receive band of Band 11 and the receive band of Band 21. The high-frequency module 100 further includes, in addition to the plurality of filters F0 shown in FIG. 1, three transmission filters F66T, F3T, and F1T, for example, as shown in FIGS. 6 and 7. The transmission filter F66T is a filter having a pass band corresponding to the transmission band of Band 66 of the 3GPP LTE standard and the transmission band of n70 of the 5G NR standard. In FIG. 7, "B66/n70Tx" is written on the left side of the graphical symbol of the transmission filter F66T. The transmission filter F3T is a filter having a pass band corresponding to the transmission band of Band 3. In FIG. 7, "B3Tx" is written on the left side of the graphical symbol of the transmission filter F3T. The transmission filter F1T is a filter having a pass band corresponding to the transmission band of Band 1. In FIG. 1, "B1Tx" is written on the left side of the graphical symbol of the transmission filter F1T. In the examples of FIGS. 6 and 7, the receive filter F25 has a pass band that includes a receive band of Band 25 of the 3GPP LTE standard and a receive band of n70 of the 5G NR standard. In FIG. 7, "B25/n70Rx" is written on the left side of the graphical symbol of the receive filter F25. Further, the receive filter F32 has pass bands including the receive band of Band 32 of the 3GPP LTE standard, and the receive band of n75 and the receive band of n76 of the 5G NR standard. In FIG. 7, "B32/n75/n76" is written on the left side of the graphical symbol of the receive filter F32.

For example, as shown in FIG. 5, the high-frequency module 100 includes a plurality of external connection terminals 8, three matching circuits 161, 162, and 163, a receiving circuit 101 connected to a switch 7, and a transmitting circuit 102 connected to the switch 7.

As shown in FIG. 5, the plurality of external connection terminals 8 include three antenna terminals 81A, 81B, and 81C, four signal output terminals 82A, 82B, 82C, and 82D, two signal input terminals 83A and 83B, and four control terminals 84, a plurality of ground terminals 85 (refer to FIG. 9), and a power terminal (not shown). The four signal output terminals 82A, 82B, 82C, and 82D are terminals for outputting the high-frequency signals (reception signals) from the receiving circuit 101 to an external circuit (for example, a signal processing circuit 301). Two signal input terminals 83A and 83B are terminals for inputting high-frequency signals (transmission signals) from an external circuit (for example, the signal processing circuit 301) to the high-frequency module 100. The plurality of control terminals 84 are terminals for inputting control signals (digital signals) from an external circuit (for example, the signal processing circuit 301) to, for example, the receiving circuit 101, the transmitting circuit 102, and the switch 7. The plurality of ground terminals 85 are terminals to which a ground potential is applied. Further, the control terminals 84 may be disposed according to the number of circuits (for example, the switch circuits 5 and the like) to be controlled in the high-frequency module 100 by a control signal from an external circuit.

Figure 7:
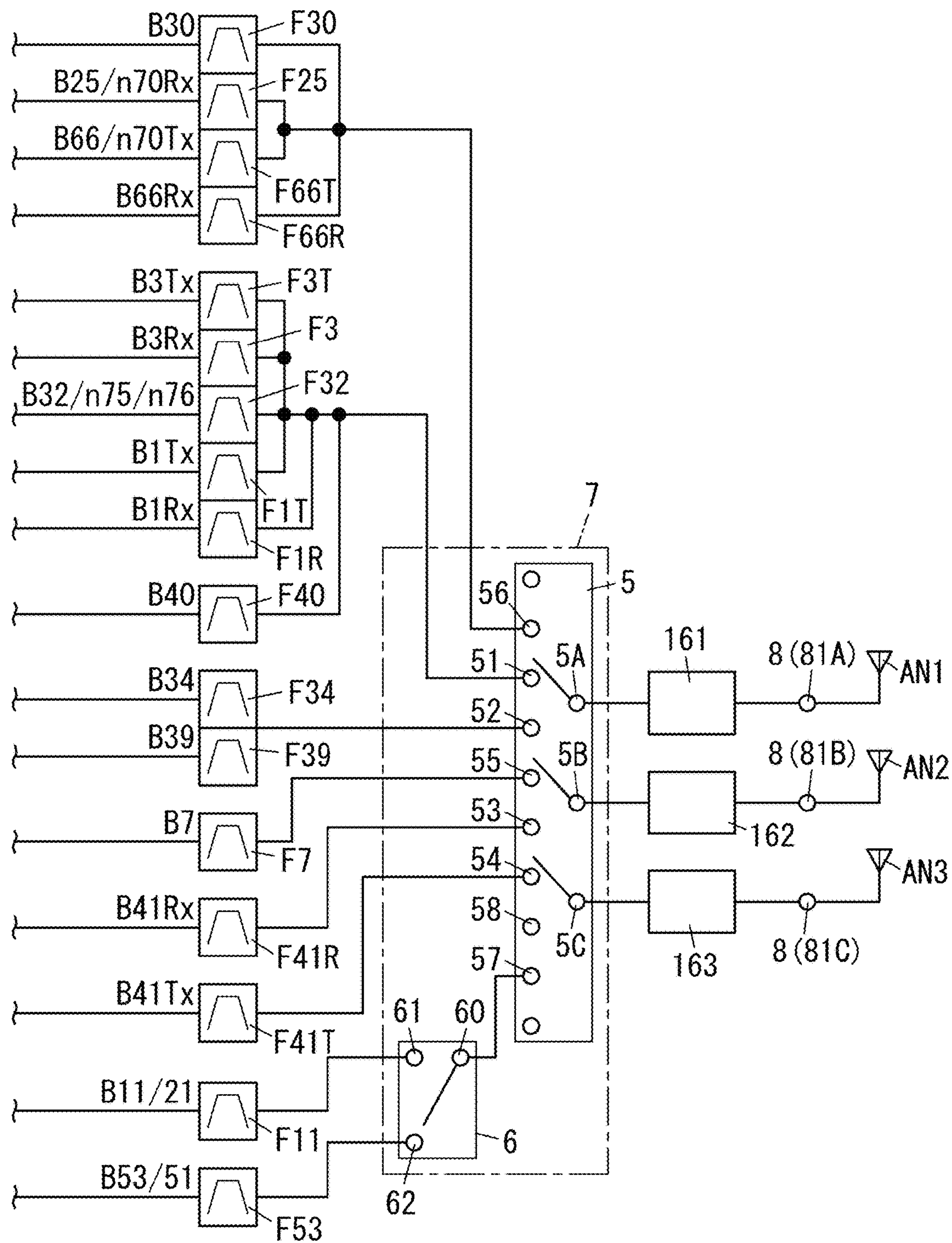
FIG. 7 is a circuit diagram of main portions of the above high-frequency module.

As shown in FIG. 7, the antenna terminal 81A is, for example, the external connection terminal 8 to which the common terminal 5A of the first switch circuit 5 is connected. The common terminal 5A of the first switch circuit 5 is, for example, connected to an antenna terminal 81A with the matching circuit 161 for impedance matching interposed therebetween. The antenna terminal 81B is the external connection terminal 8 to which the common terminal 5B of the first switch circuit 5 is connected. The common terminal 5B of the first switch circuit 5 is, for example, connected to the antenna terminal 81B with the matching circuit 162 for impedance matching interposed therebetween. The antenna terminal 81C is, for example, the external connection terminal 8 to which the common terminal 5C of the first switch circuit 5 is connected. The common terminal 5C of the first switch circuit 5 is, for example, connected to the antenna terminal 81C with the matching circuit 163 for impedance matching interposed therebetween. Each of the matching circuits 161, 162, and 163 includes, for example, at least one inductor and at least one capacitor, but the present disclosure is not limited thereto.

The receiving circuit 101 (refer to FIG. 5) is configured to be capable of amplifying a reception signal input to the high-frequency module 100 from, for example, three antennas AN1, AN2, and AN3 (refer to FIG. 5), and outputting the amplified reception signal to the external circuit (for example, the signal processing circuit 301). The signal processing circuit 301 is not a constituent element of the high-frequency module 100, but a constituent element of the communication device 300 including the high-frequency module 100. The receiving circuit 101 is controlled by, for example, the signal processing circuit 301.

Figure 6:
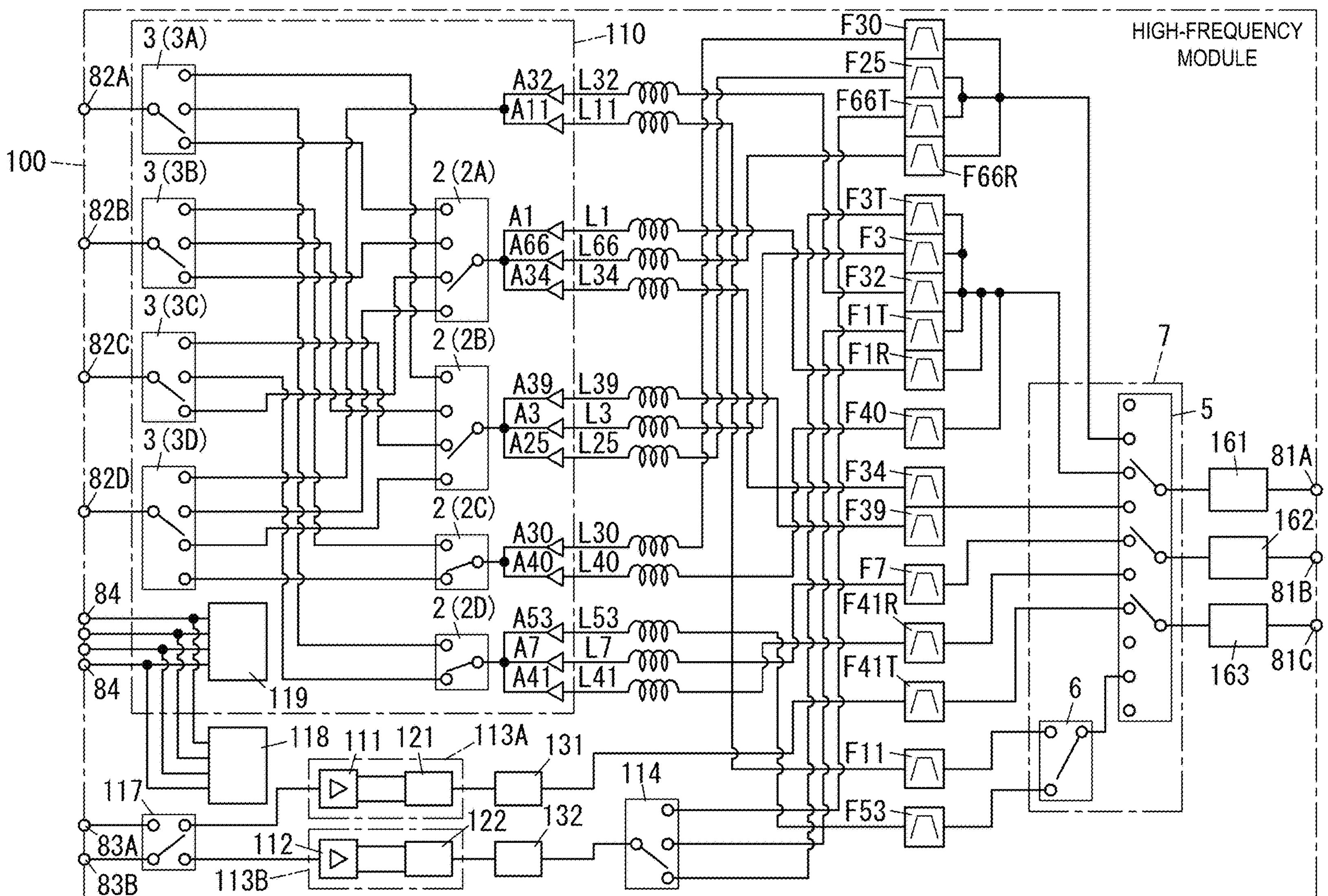
FIG. 6 is a circuit diagram of the above high-frequency module.

For example, as shown in FIG. 6, the receiving circuit 101 includes a plurality of (for example, 13) receive filters F40, F1R, F32, F34, F39, F3, F41R, F7, F25, F66R, F30, F53, and F11. Further, the receiving circuit 101 includes a plurality of (for example, 13) low-noise amplifiers A40, A1, A32, A34, A39, A3, A41, A7, A25, A66, A30, A53, and A11. Further, the receiving circuit 101 includes a plurality of inductors L40, L1, L32, L34, L39, L41, L7, L25, L66, L30, L53, and L11. Further, the receiving circuit 101 includes a plurality (for example, 4) of first switches 2 and a plurality of (for example, 4) second switches 3. The plurality of low-noise amplifiers A40, A1, A32, A34, A39, A3, A41, A7, A25, A66, A30, A53, and A11 are connected to the plurality of receive filters F40, F1R, F32, F34, F39, F3, F41R, F7, F25, F66R, F30, F53, and F11. In the receiving circuit 101, the plurality of (for example, 13) inductors L40, L1, L32, L34, L39, L3, L41, L7, L25, L66, L30, L53, and L11 are circuit elements of an input matching circuit for matching the impedances of the plurality of (for example, 13) low-noise amplifiers A40, A1, A32, A34, A39, A3, A41, A7, A25, A66, A30, A53, and A11, and the plurality of (for example, 13) receive filters F40, F1R, F32, F34, F39, F3, F41R, F7, F25, F66R, F30, F53, and F11. The receiving circuit 101 is configured to include the plurality of first switches 2 and the plurality of second switches 3 such that the reception signals amplified by each of the plurality of (for example, 13) low-noise amplifiers A40, A1, A32, A34, A39, A3, A41, A7, A25, A66, A30, A53, and A11 can be output from any of the plurality of signal output terminals 82A, 82B, 82C, or 82D. In FIG. 6, the second switch 3 connected to the signal output terminal 82A is defined as a second switch 3A, the second switch 3 connected to the signal output terminal 82B is defined as a second switch 3B, the second switch 3 connected to the signal output terminal 82C is defined as the second switch 3C, and the second switch 3 connected to the signal output terminal 82D is defined as a second switch 3D. In addition, in FIG. 6, the first switch 2 to which the three low-noise amplifiers A1, A66, and A34 are connected is defined as a first switch 2A, the first switch 2 to which the three low-noise amplifiers A39, A3, and A25 are connected is defined as a first switch 2B, the first switch 2 to which the two low-noise amplifiers A30 and A40 are connected is defined as the first switch 2C, and the first switch 2 to which the three low-noise amplifiers A53, A7, and A41 are connected is defined as a first switch 2D. Each of the plurality of first switches 2 and the plurality of second switches 3 is a switch that includes, for example, one common terminal and a plurality of selection terminals, and is capable of one-to-one and one-to-many connection. The high-frequency module 100 can support simultaneous communication in two or more communication bands among, for example, Band 1, Band 3, Band 40, Band 32, and Band 7. Further, the high-frequency module 100 can support simultaneous communication in two or more communication bands among, for example, Band 34, Band 39, and Band 41. Further, the high-frequency module 100 can support simultaneous communication in two or more communication bands among, for example, Band 34, Band 39, and Band 41.

The transmitting circuit 102 (refer to FIG. 5) is configured, for example, such that a transmission signal input from the signal processing circuit 301 can be amplified and output to the two antennas AN1 and AN3. The transmitting circuit 102 is controlled by, for example, the signal processing circuit 301.

For example, as shown in FIG. 6, the transmitting circuit 102 includes a plurality of (for example, 2) power amplifiers 113A and 113B, a plurality of (for example, 4) transmission filters F66T, F3T, F1T, and F41T, a plurality of (for example, 2) output matching circuits 131 and 132, a switch 117, and a switch 114. Each of the two power amplifiers 113A and 113B has an input terminal and an output terminal. Each of the plurality of power amplifiers 113A and 113B amplifies the transmission signal input to the input terminal to output the amplified transmission signal from the output terminal. The input terminal of the power amplifier 113A and the input terminal of the power amplifier 113B are connected to the signal input terminal 83A or the signal input terminal 83B with the switch 117 interposed therebetween. Therefore, in the communication device 300 (refer to FIG. 5) including the high-frequency module 100, the input terminal of the power amplifier 113A and the input terminal of the power amplifier 113B are connected to the signal processing circuit 301 of the communication device 300 with the switch 117 and the signal input terminal 83A or the signal input terminal 83B interposed therebetween. The power amplifier 113A and the power amplifier 113B power-amplify the high-frequency signals in the transmission bands of the communication bands different from each other. The output terminal of the power amplifier 113A is connected to the first switch circuit 5 with the output matching circuit 131 and the transmission filter F41T interposed therebetween. The output terminal of the power amplifier 113B can be connected to a plurality of (for example, 3) transmission filters F66T, F1T, and F3T with the output matching circuit 132 and the switch 114 interposed therebetween. The power amplifier 113A is, for example, a differential synthetic amplifier, and includes an amplifier 111 and a transformer 121. The power amplifier 113B is, for example, a differential synthetic amplifier, and includes an amplifier 112 and a transformer 122. Each of the two power amplifiers 113A and 113B is not limited to the differential synthetic amplifier, and may be, for example, a Doherty amplifier. The high-frequency module 100 further includes a controller 118 that controls the power amplifiers 113A and 113B. The controller 118 controls the power amplifiers 113A and 113B, for example, according to a control signal from the signal processing circuit 301. In addition, the controller 118 is connected to the signal processing circuit 301 with a plurality of (for example, 4) control terminals 84 interposed therebetween. The plurality of control terminals 84 are terminals for inputting control signals from an external circuit (for example, the signal processing circuit 301) to the controller 118 and the like. The controller 118 controls the power amplifiers 113A and 113B, the switch 117, and the switch 114 based on control signals acquired from the signal processing circuit 301 with the plurality of control terminals 84 interposed therebetween. The control signals acquired by the controller 118 are digital signals. The output matching circuit 131 is provided in the signal path between the output terminal of the power amplifier 113A and the transmission filter F41T. The output matching circuit 131 is a circuit for impedance matching between the power amplifier 113A and the transmission filter F41T, and includes, for example, a plurality of inductors and a plurality of capacitors. Further, the output matching circuit 132 is provided in the signal path between the output terminal of the power amplifier 113B and the switch 114. The output matching circuit 132 is a circuit for impedance matching between the power amplifier 113B and the three transmission filters F3T, F1T, and F41T, and includes, for example, a plurality of inductors and a plurality of capacitors.

In the high-frequency module 100, the IC chip 1 further has a control circuit 17 (refer to FIG. 1) that controls the switch circuit 5. The control circuit 17 controls the plurality of (for example, 21) series switching elements and the plurality of (for example, 7) shunt switching elements of the switch circuit 5. In short, the control circuit 17 controls the plurality of switching elements Q11 to Q13, Q21 to Q23, Q31 to Q33, Q41 to Q43, Q51 to Q53, Q61 to Q63, and Q71 to Q73, and the plurality of switching elements Q10, Q20, Q30, Q40, Q50, Q60, and Q70 are respectively controlled to be a conduction state (on) or a non-conduction state (off). Further, the control circuit 17 also controls the plurality of series switching elements and the plurality of shunt switching elements of the second switch circuit 6. In short, the control circuit 17 controls each of the plurality of switching elements Q81 and Q91 and the plurality of switching elements Q80 and Q90 to be in a conduction state (on) or a non-conduction state (off). In the case of FET, each of the plurality of switching elements Q11 to Q13, Q21 to Q23, Q31 to Q33, Q41 to Q43, Q51 to Q53, Q61 to Q63, and Q71 to Q73, and each of the plurality of switching elements Q10, Q20, Q30, Q40, Q50, Q60, and Q70 are in a conduction state when the gate-source voltage of the FET is equal to or larger than the gate threshold voltage, and is in a non-conduction state when the gate-source voltage of the FET is less than the gate threshold voltage. The control circuit 17 controls a gate-source voltage of FET that configures each of the plurality of switching elements Q11 to Q13, Q21 to Q23, Q31 to Q33, Q41 to Q43, Q51 to Q53, Q61 to Q63, and Q71 to Q73, and the plurality of switching elements Q10, Q20, Q30, Q40, Q50, Q60, and Q70, to control the plurality of switching elements Q11 to Q13, Q21 to Q23, Q31 to Q33, Q41 to Q43, Q51 to Q53, Q61 to Q63, and Q71 to Q73 and the plurality of switching elements Q10, Q20, Q30, Q40, Q50, Q60, and Q70. In addition, in the case of a FET, each of the plurality of switching elements Q81 and Q91 and the plurality of switching elements Q80 and Q90 is in a conduction state when the gate-source voltage of the FET is equal to or larger than the gate threshold voltage, and is in a non-conduction state when the gate-source voltage of FET is less than the gate threshold voltage. The control circuit 17 controls the gate-source voltages of the FET that configures the plurality of switching elements Q81 and Q91 and the plurality of switching elements Q80 and Q90 to control the plurality of switching elements Q81 and Q91 and the plurality of switching elements Q80 and Q90. The control circuit 17 controls the plurality of series switching elements and the plurality of shunt switching elements of the first switch circuit 5, and the plurality of series switching elements and the plurality of shunt switching elements of the second switch circuit 6, for example, according to control signals (digital signals) acquired from the plurality of control terminals 84 (refer to FIG. 5). The control circuit 17 is a logic circuit that controls the first switch circuit 5 and the second switch circuit 6 according to the control signal from the signal processing circuit 301. The control signal received by the control circuit 17 from the signal processing circuit 301 is, for example, a first command corresponding to carrier aggregation or dual connectivity of two or more communication bands different from each other, a second command corresponding to single communication in one communication band, and the like. The high-frequency module 100 operates in a first mode when the control circuit 17 receives the first command, and operates in the second mode when the control circuit 17 receives the second command. The first mode is, for example, a mode in which simultaneous transmission or simultaneous reception, or simultaneous transmission and reception is possible using two or more filters having pass bands corresponding to communication bands different from each other in the plurality of filters F0. The second mode is, for example, a mode in which transmission or reception using only one filter F0 in the plurality of filters F0 is possible.

(2.1.2) Structure of High-Frequency Module

Hereinafter, the entire configuration of the high-frequency module 100 will be described with reference to FIGS. 8 and 9.

Figure 8:
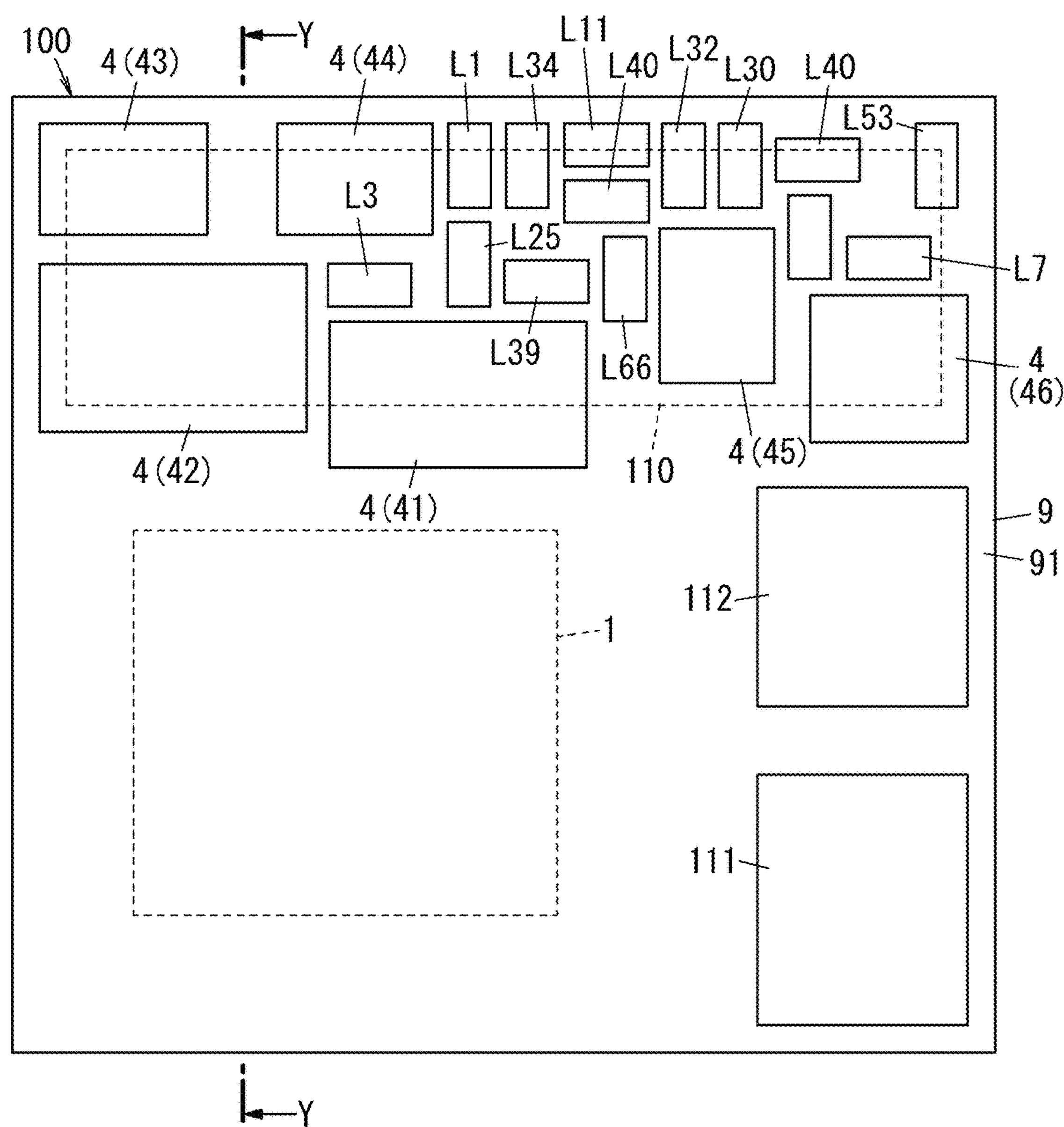
FIG. 8 is a plan view of the above high-frequency module.
Figure 9:
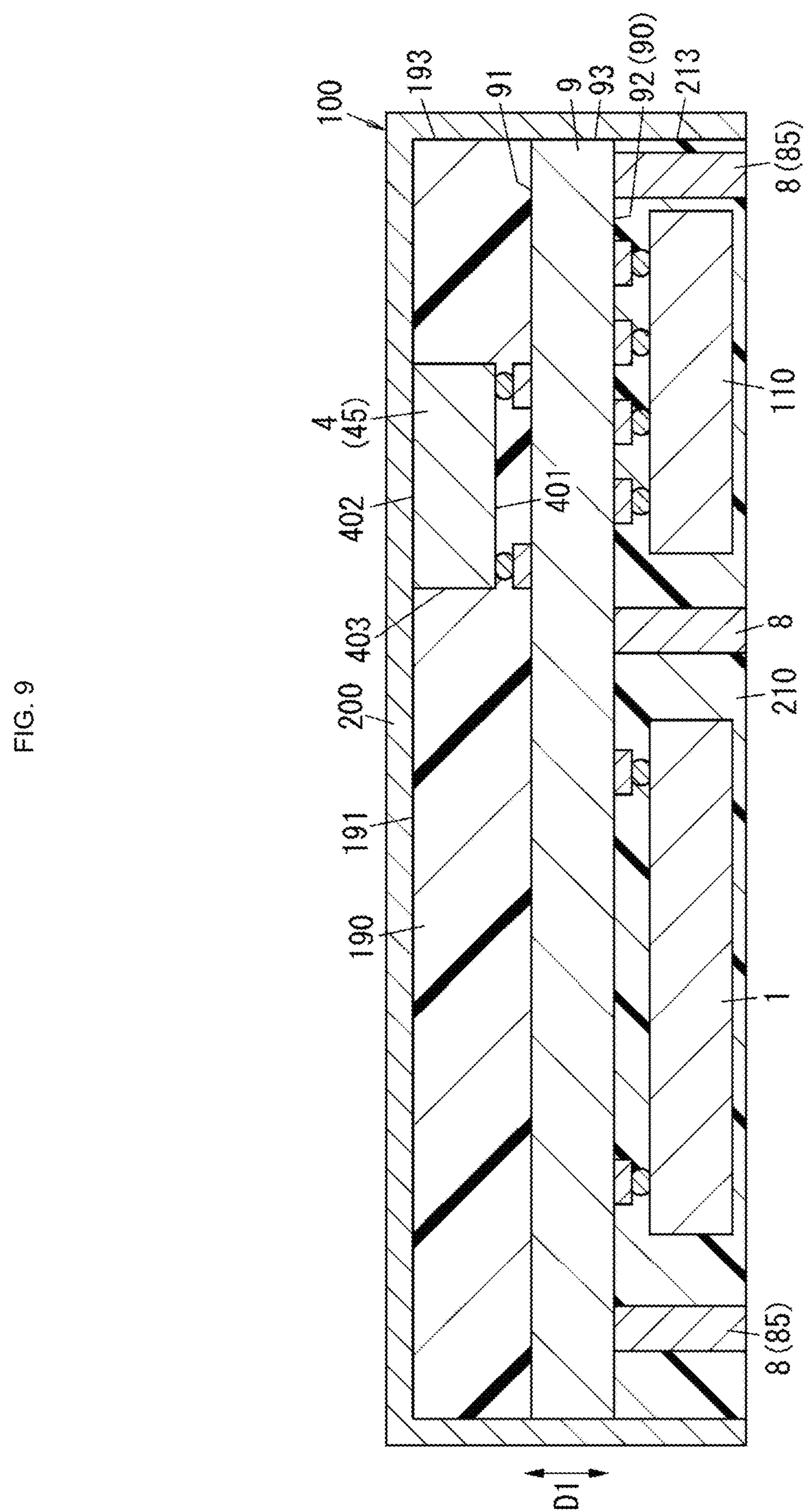
FIG. 9 is a cross-sectional view taken along line Y-Y in FIG. 8, showing the above high-frequency module.

As shown in FIGS. 8 and 9, the high-frequency module 100 includes the mounting board 9 and the IC chip 1. In addition, the high-frequency module 100 further includes a plurality of receiving system electronic components 4 and a plurality of inductors L40, L1, L32, L34, L39, L3, L41, L7, L25, L66, L30, L53, and L11. Each of the plurality of receiving system electronic components 4 includes at least one receive filter among the plurality of receive filters F40, F1R, F32, F34, F39, F3, F41R, F7, F25, F66R, F30, F53, and F11. In addition, the high-frequency module 100 further includes an IC chip 110. The IC chip 110 includes the plurality of low-noise amplifiers A40, A1, A32, A34, A39, A3, A41, A7, A25, A66, A30, A53, and A11 (refer to FIG.

6). Further, the IC chip 110 includes the plurality (for example, 4) of first switches 2 (refer to FIG. 6) and the plurality of (for example, 4) second switches 3 (refer to FIG. 6). Further, the IC chip 110 further includes a control unit 119. In addition, the control unit 119 is connected to the signal processing circuit 301 with the plurality of (for example, 4) control terminals 84 interposed therebetween. The control unit 119 controls the plurality of low-noise amplifiers A40, A1, A32, A34, A39, A3, A41, A7, A25, A66, A30, A53, and A11, the plurality of first switches 2, and the plurality of second switches 3 based on the control signals acquired from the signal processing circuit 301 through the plurality of control terminals 84. Further, the high-frequency module 100 further includes three matching circuits 161, 162, and 163 (refer to FIG. 6). In addition, the high-frequency module 100 further includes the amplifiers 111 and 112 and two transformers 121 and 122 of two power amplifiers 113A and 113B, two output matching circuits 131 and 132, the switch 117, the switch 114, and the controller 118 (refer to FIG. 6). In addition, the high-frequency module 100 further includes the plurality of external connection terminals 8. In addition, the high-frequency module 100 further includes a resin layer 190 (hereinafter referred to as a first resin layer 190), a metal electrode layer 200, and a second resin layer 210. In addition, FIG. 8 does not show the first resin layer 190 and the metal electrode layer 200.

An outer edge of the mounting board 9 has a quadrangle shape in plan view in the thickness direction D1 of the mounting board 9. As shown in FIG. 9, the mounting board 9 has the first main surface 91 and the second main surface 92 facing each other in the thickness direction D1 of the mounting board 9. Here, the second main surface 92 of the mounting board 9 in FIG. 9 is the main surface 90 of the mounting board 9 in FIGS. 2 to 4. Further, the mounting board 9 has an outer peripheral surface 93. The outer peripheral surface 93 of the mounting board 9 includes, for example, four side surfaces that connect the outer edge of the first main surface 91 and the outer edge of the second main surface 92 of the mounting board 9, and does not include the first main surface 91 and the second main surface 92. That is, the mounting board 9 is a multilayer substrate including the plurality of dielectric layers and the plurality of conductive layers. The plurality of dielectric layers and the plurality of conductive layers are laminated in the thickness direction D1 of the mounting board 9. The plurality of conductive layers are formed in a predetermined pattern determined for each layer. Each of the plurality of conductive layers includes one or a plurality of conductor portions in one plane orthogonal to the thickness direction D1 of the mounting board 9. A material of each conductive layer is, for example, copper. The plurality of conductive layers include a ground layer. In the high-frequency module 100, the plurality of ground terminals 85 and the ground layer are electrically connected to each other with the via-conductor and the like of the mounting board 9 interposed therebetween. The mounting board 9 is, for example, a printed wiring board. The mounting board is not limited to a printed wiring board, and may be, for example, a low temperature co-fired ceramics (LTCC) substrate, a high temperature co-fired ceramics (HTCC) substrate, or a resin multilayer substrate.

The first main surface 91 and the second main surface 92 of the mounting board 9 are separated in the thickness direction D1 of the mounting board 9, and intersect with the thickness direction D1 of the mounting board 9. The first main surface 91 of the mounting board 9 is, for example, orthogonal to the thickness direction D1 of the mounting board 9, and may include, for example, a side surface or the like of a conductor portion as a surface that is not orthogonal to the thickness direction D1. In addition, for example, the second main surface 92 of the mounting board 9 is orthogonal to the thickness direction D1 of the mounting board 9, but may include, for example, a side surface of the conductor portion or the like, as a surface that is not orthogonal to the thickness direction D1. Further, the first main surface 91 and the second main surface 92 of the mounting board 9 may be formed with a fine roughness portion, a recess portion, or a projection portion. For example, when a recess portion is formed on the first main surface 91 of the mounting board 9, the inner surface of the recess portion is included in the first main surface 91.

In the high-frequency module 100, a plurality of first circuit components are mounted on the first main surface 91 of the mounting board 9. The plurality of first circuit components include the plurality of (for example, 6) receiving system electronic components 4, the plurality of (for example, 13) inductors L40, L1, L32, L34, L39, L3, L41, L7, L25, L66, L30, L53, and L11, and the plurality of transmitting system electronic components. Each of the plurality of inductors L40, L1, L32, L34, L39, L3, L41, L7, L25, L66, L30, L53, and L11 is a surface mount electronic component, that is, a chip inductor. Further, the plurality of first circuit components include a plurality of inductors and a plurality of capacitors of each of the output matching circuits 131 and 132. Each of the plurality of inductors included in each of the output matching circuits 131 and 132 is a surface mount electronic component, that is, a chip inductor. In addition, each of the plurality of capacitors included in the output matching circuits 131 and 132 is a surface mount electronic component, that is, a chip capacitor. The fact that "the first circuit components are mounted on the first main surface 91 of the mounting board 9" means that the first circuit components are disposed on (mechanically connected to) the first main surface 91 of the mounting board 9 and the first circuit components are electrically connected to the (appropriate conductor portion of) mounting board 9.

In the high-frequency module 100, a plurality of second circuit components are mounted on the second main surface 92 of the mounting board 9. The plurality of second circuit components include the IC chip 1 and the IC chip 110. The fact that "the second circuit components are mounted on the second main surface 92 of the mounting board 9" means that the second circuit components are disposed on (mechanically connected to) the second main surface 92 of the mounting board 9 and the second circuit components are electrically connected to the (appropriate conductor portion of) mounting board 9.

An outer edge of each of the plurality of receiving system electronic components 4 has, for example, a quadrangle shape in plan view in the thickness direction D1 of the mounting board 9. Each of the plurality of receiving system electronic components 4 includes a main surface 401 on the mounting board 9 side, a main surface 402 opposite to the mounting board 9 side, and an outer peripheral surface 403 that connects the main surface 401 and the main surface 402 to each other. The outer peripheral surface 403 includes at least four side surfaces. Hereinafter, for convenience of the description, when the plurality of receiving system electronic components 4 are distinguished, the receiving system electronic components 4 are referred to as a receiving system electronic component 41, a receiving system electronic component 42, a receiving system electronic component 43, a receiving system electronic component 44, a receiving system electronic component 45, and a receiving system electronic component 46. The receiving system electronic component 41 includes, for example, three receive filters F30, F25, and F66R (refer to FIG. 7). The receiving system electronic component 42 includes, for example, three receive filters F3, F32, and F1R (refer to FIG. 7). The receiving system electronic component 43 includes, for example, one receive filter F40 (refer to FIG. 7). The receiving system electronic component 44 includes, for example, two receive filters F34 and F39 (refer to FIG. 7). The receiving system electronic component 45 includes, for example, two receive filters F7 and F41R (refer to FIG. 7). The receiving system electronic component 46 includes, for example, two receive filters F11 and F53 (refer to FIG. 7). Therefore, in the high-frequency module 100, the plurality of receive filters F40, F1R, F32, F34, F39, F3, F41R, F7, F25, F66R, F30, F53, and F11 are disposed on the first main surface 91 of the mounting board 9.

Each of the plurality of receive filters F40, F1R, F32, F34, F39, F3, F41R, F7, F25, F66R, F30, F53, and F11 is, for example, a ladder filter, and includes a plurality of (for example, 4) series arm resonators and a plurality of (for example, 3) parallel arm resonators. Each of the plurality of receive filters F40, F1R, F32, F34, F39, F3, F41R, F7, F25, F66R, F30, F53, and F11 is, for example, an acoustic wave filter. Here, in the acoustic wave filter, for example, each of a plurality of series arm resonators and a plurality of parallel arm resonators is configured with an acoustic wave resonator. The acoustic wave filter is, for example, a surface acoustic wave filter that uses surface acoustic waves. In the surface acoustic wave filter, each of the plurality of series arm resonators and the plurality of parallel arm resonators is, for example, a surface acoustic wave (SAW) resonator, and has an interdigital transducer (IDT) electrode.

The plurality of transmitting system electronic components include, for example, an amplifier 111 of the power amplifier 113A, an amplifier 112 of the power amplifier 113B, and a plurality of transmission filters F66T, F3T, F1T, and F41T (refer to FIGS. 6 and 7). Each of the amplifiers 111 and 112 is an IC chip for power amplification. The power amplification IC chip is, for example, a GaAs IC chip when the amplification transistor is a Heterojunction Bipolar Transistor (HBT). In addition, the power amplification IC chip is, for example, a Si-based IC chip, for example, when the amplification transistor is a bipolar transistor or a field effect transistor (FET).

Each of the plurality of transmission filters F66T, F3T, F1T, and F41T is, for example, a ladder filter, and includes a plurality of (for example, 4) series arm resonators and a plurality of (for example, 3) parallel arm resonators. Each of the plurality of transmission filters F66T, F3T, F1T, and F41T is, for example, an acoustic wave filter. Here, in the acoustic wave filter, for example, each of a plurality of series arm resonators and a plurality of parallel arm resonators is configured with an acoustic wave resonator. The acoustic wave filter is, for example, a surface acoustic wave filter that uses surface acoustic waves. In the surface acoustic wave filter, each of the plurality of series arm resonators and the plurality of parallel arm resonators is, for example, an SAW resonator, and has an IDT electrode.

The plurality of external connection terminals 8 (refer to FIGS. 5 and 9) are disposed on the second main surface 92 of the mounting board 9. The fact that "the external connection terminals 8 are disposed on the second main surface 92 of the mounting board 9" means that the external connection terminals 8 are mechanically connected to the second main surface 92 of the mounting board 9 and the external connection terminals 8 are electrically connected to the (appropriate conductor portion of) mounting board 9.

The plurality of external connection terminals 8 include three antenna terminals 81A, 81B, and 81C, four signal output terminals 82A, 82B, 82C, and 82D, two signal input terminals 83A and 83B, the plurality of control terminals 84, the plurality of ground terminals 85, and the power terminal (not shown). The plurality of ground terminals 85 are electrically connected to the ground layer of the mounting board 9. The ground layer is a circuit ground of the high-frequency module 100, and the plurality of circuit components of the high-frequency module 100 include circuit components electrically connected to the ground layer.

Materials of the plurality of external connection terminals 8 are, for example, metal (for example, copper, copper alloy, or the like). The plurality of external connection terminals 8 are not constituent elements of the mounting board 9, but may be constituent elements of the mounting board 9. Each of the plurality of external connection terminals 8 is a columnar electrode (for example, a cylindrical electrode).

As shown in FIG. 9, the first resin layer 190 is disposed on the first main surface 91 of the mounting board 9. The first resin layer 190 contains resin (for example, epoxy resin). The first resin layer 190 may contain a filler in addition to resin. The first resin layer 190 has electric insulation.

The first resin layer 190 covers the outer peripheral surface 403 of each of the plurality of receiving system electronic components 4. In addition, the first resin layer 190 includes the amplifiers 111 and 112 of two power amplifiers 113A and 113B, a plurality of inductors and a plurality of capacitors in each of the two output matching circuits 131 and 132, and the plurality of inductors L40, L1, L32, L34, L39, L3, L41, L7, L25, L66, L30, L53, and L11.

The metal electrode layer 200 includes the main surfaces 402 of each of the plurality of receiving system electronic components 4, the main surface 191 of the first resin layer 190 opposite to the mounting board 9 side, the outer peripheral surface 193 of the first resin layer 190, the outer peripheral surface 93 of the mounting board 9, and an outer peripheral surface 213 of the second resin layer 210 which will be described later. The metal electrode layer 200 is in contact with at least a part of the outer peripheral surface of the ground layer of the mounting board 9. Thus, a potential of the metal electrode layer 200 can be set to be the same as a potential of the ground layer. The metal electrode layer 200 has a multilayer structure in which a plurality of metal layers are laminated, but the present disclosure is not limited thereto, and the metal electrode layer 200 may be formed of one metal layer. The metal layer includes one or more metals. When the metal electrode layer 200 has a multilayer structure in which a plurality of metal layers are laminated, for example, a first metal layer (for example, a first stainless steel layer), a second metal layer (for example, a Cu layer) on the first metal layer, and a third metal layer (for example, a second stainless steel layer) on the second metal layer. A material of each of the first stainless steel layer and the second stainless steel layer is an alloy including Fe, Ni, and Cr. In addition, the metal electrode layer 200 is, for example, a Cu layer when the metal electrode layer 200 is formed of one metal layer.

The second resin layer 210 covers the IC chip 1, the IC chip 110, and the outer peripheral surfaces of each of the plurality of external connection terminals 8. The second resin layer 210 does not cover the end surface of the plurality of external connection terminals 8 opposite to the mounting board 9 side. The second resin layer 210 contains resin (for example, epoxy resin). The second resin layer 210 may contain a filler in addition to resin. The material of the second resin layer 210 may be the same material as the material of the first resin layer 190 or may be a different material.

(2.1.3) Details of IC Chip Including First Switch Circuit

As shown in FIGS. 2 to 4, the IC chip 1 is disposed on the main surface 90 of the mounting board 9. The IC chip 1 includes a part of the first switch circuit 5 (refer to FIG. 1). Further, the IC chip 1 further includes a second switch circuit 6 (refer to FIG. 1).

The IC chip 1 is, for example, a Si-based IC chip. The IC chip 1 has the plurality of pad electrodes 16 (refer to FIGS. 3 and 4). The IC chip 1 is flip-chip mounted on the main surface 90 (in FIG. 9, the second main surface 92) of the mounting board 9. More specifically, the IC chip 1 is mounted on the mounting board 9 by bonding the plurality of pad electrodes 16 to the mounting board 9 by the conductive bumps 19 corresponding to the plurality of pad electrodes 16 on a one-to-one basis. The plurality of conductive bumps 19 connect the mounting board 9 to the plurality of common terminals 5A, 5B, and 5C and the plurality of selection terminals 51 to 57 of the IC chip 1. A material of the plurality of conductive bumps 19 is, for example, a solder. In plan view in the thickness direction D1 (refer to FIGS. 3 and 4) of the mounting board 9, an outer peripheral shape of the IC chip 1 is a quadrangle shape. In the high-frequency module 100, the second wiring pattern portion r2 overlaps the IC chip 1 in plan view in the thickness direction D1 of the mounting board 9 (refer to FIGS. 2 and 3). In the high-frequency module 100, the entire second wiring pattern portion r2 overlaps the IC chip 1 in plan view in the thickness direction D1 of the mounting board 9, but the present disclosure is not limited thereto, and at least a part of the second wiring pattern portion r2 may overlap the IC chip 1.

In the IC chip 1, the plurality of pad electrodes 16 include the plurality of common terminals 5A, 5B, and 5C and the plurality of selection terminals 51 to 57 of the switch circuit 5 (refer to FIG. 1). The IC chip 1 includes a plurality of switching elements Q11 to Q13, Q21 to Q23, Q31 to Q33, Q41 to Q43, Q51 to Q53, Q61 to Q63, and Q71 to Q73 of the switch circuit 5. The material of each of the plurality of pad electrodes 16 is, for example, an aluminum alloy or gold.

Among the plurality of signal paths r11 to r13, r21 to r23, r31 to r33, r41 to r43, r51 to r53, r61 to r63, and r71 to r73 of the switch circuit 5, each of the signal paths r11 to r13, r21 to r23, r61 to r62, and r71 to r73 includes the first wiring pattern portion r1 included in the IC chip 1 and the second wiring pattern portion r2 included in the mounting board 9. In the high-frequency module 100, a surface Sr2 on the IC chip 1 side (refer to FIG. 3) in the second wiring pattern portion r2 is a part of the main surface 90 of the mounting board 9. In the high-frequency module 100, at least a part of the signal path r67 that connects the first switch circuit 5 and the second switch circuit 6 includes the wiring pattern portion 67 (refer to FIGS. 1 and 2) on the mounting board 9. In the high-frequency module 100, the second switch circuit 6 is connected to the selection terminal 57 among the plurality of selection terminals 51 to 57 of the first switch circuit 5.

The second wiring pattern portion r2 (second wiring pattern portion 311) in the signal path r11 is, for example, a part between a node to which the switching element Q11 (series switching element) is connected in the second wiring portion 31 and a node to which the switching element Q10 (shunt switching element) is connected in the second wiring portion 31, in the signal path r11. The second wiring pattern portion r2 (second wiring pattern portion 311) in the signal path r12 is, for example, a part between a node to which the switching element Q11 is connected in the second wiring portion 31 and a node to which the switching element Q10 is connected in the second wiring portion 31, in the signal path r12. The second wiring pattern portion r2 (second wiring pattern portion 311) in the signal path r13 is, for example, a part between a node to which the switching element Q11 is connected in the second wiring portion 31 and a node to which the switching element Q10 is connected in the second wiring portion 31, in the signal path r13. The three signal paths r11 to r13 include a common second wiring pattern portion 311.

The second wiring pattern portion r2 (second wiring pattern portion 321) in the signal path r21 is, for example, a part between a node to which the switching element Q21 (series switching element) is connected in the second wiring portion 32 and a node to which the switching element Q20 (shunt switching element) is connected in the second wiring portion 32, in the signal path r21. The second wiring pattern portion r2 (second wiring pattern portion 321) in the signal path r22 is, for example, a part between a node to which the switching element Q21 is connected in the second wiring portion 32 and a node to which the switching element Q20 is connected in the second wiring portion 32, in the signal path r22. The second wiring pattern portion r2 (second wiring pattern portion 321) in the signal path r23 is, for example, a part between a node to which the switching element Q21 is connected in the second wiring portion 32 and a node to which the switching element Q20 is connected in the second wiring portion 32, in the signal path r23. The three signal paths r21 to r23 include a common second wiring pattern portion 321.

The second wiring pattern portion r2 (second wiring pattern portion 361) in the signal path r61 is, for example, a part between a node to which the switching element Q61 (series switching element) is connected in the second wiring portion 36 and a node to which the switching element Q60 (shunt switching element) is connected in the second wiring portion 36, in the signal path r61. The second wiring pattern portion r2 (second wiring pattern portion 361) in the signal path r62 is, for example, a part between a node to which the switching element Q61 is connected in the second wiring portion 36 and a node to which the switching element Q60 is connected in the second wiring portion 36, in the signal path r62. The second wiring pattern portion r2 (second wiring pattern portion 361) in the signal path r63 is, for example, a part between a node to which the switching element Q61 is connected in the second wiring portion 36 and a node to which the switching element Q60 is connected in the second wiring portion 36, in the signal path r63. The three signal paths r61 to r63 include a common second wiring pattern portion 361.

The second wiring pattern portion r2 (second wiring pattern portion 371) in the signal path r71 is, for example, a part between a node to which the switching element Q71 (series switching element) is connected in the second wiring portion 37 and a node to which the switching element Q70 (shunt switching element) is connected in the second wiring portion 37, in the signal path r71. The second wiring pattern portion r2 (second wiring pattern portion 371) in the signal path r72 is, for example, a part between a node to which the switching element Q71 is connected in the second wiring portion 37 and a node to which the switching element Q70 is connected in the second wiring portion 37, in the signal path r72. The second wiring pattern portion r2 (second wiring pattern portion 371) in the signal path r73 is, for example, a part between a node to which the switching element Q71 is connected in the second wiring portion 37 and a node to which the switching element Q70 is connected in the second wiring portion 37, in the signal path r73. The three signal paths r71 to r73 include a common second wiring pattern portion 371.

In the high-frequency module 100, the switch circuit 5 can simultaneously connect two or more selection terminals among the plurality of selection terminals 51 to 57 to one common terminal among the plurality of common terminals 5A, 5B, and 5C. The two or more selection terminals include a first selection terminal (for example, the selection terminal 55) and a second selection terminal (for example, the selection terminal 51). The plurality of signal paths r11 to r13, r21 to r23, r31 to r33, r41 to r43, r51 to r53, r61 to r63, and r71 to r73 include a first signal path between the first selection terminal and the one common terminal and a second signal path between the second selection terminal and the one common terminal. At least one of the first signal path and the second signal path includes the first wiring pattern portion r1 and the second wiring pattern portion r2. In the example of FIG. 1, the combination of the first selection terminal and the second selection terminal is, for example, not limited to the combination of the selection terminal 55 and the selection terminal 51, but also a combination of the selection terminal 51 and the selection terminal 55, a combination of the selection terminal 54 and the selection terminal 51, a combination of the selection terminal 51 and the selection terminal 54, a combination of the selection terminal 56 and the selection terminal 55, a combination of the selection terminal 55 and the selection terminal 56, a combination of the selection terminal 53 and the selection terminal 52, and a combination of the selection terminal 52 and the selection terminal 53.

In the high-frequency module 100, the first signal path and the second signal path may intersect with each other in plan view in the thickness direction D1 of the mounting board 9. In this case, preferably, the first part (first wiring pattern portion r1) that overlaps the second signal path in the first signal path is included in the IC chip 1, and the second part (second wiring pattern portion r2) that overlaps the first signal path in the second signal path is included in the mounting board 9.

The high-frequency module 100 includes a third wiring pattern portion r3 (refer to FIGS. 2 and 4) in which the switch circuit 5 is included in the mounting board 9. The thickness T3 (refer to FIG. 4) of the third wiring pattern portion r3 is larger than the thickness T1 (refer to FIG. 4) of the first wiring pattern portion r1. A wiring width WL3 (refer to FIG. 2) of the third wiring pattern portion r3 is larger than the wiring width WL1 (refer to FIG. 2) of the first wiring pattern portion r1. The material of the third wiring pattern portion r3 is, for example, the same as the material of the second wiring pattern portion r2, but is not limited thereto and may be different. The third wiring pattern portion r3 is disposed in the mounting board 9 to be separated from the main surface 90 of the mounting board 9 in the thickness direction D1 of the mounting board 9. The third wiring pattern portion r3 is far from the first main surface 91 and the second main surface in the thickness direction D1 of the mounting board 9. As shown in FIG. 4, a distance H3 between the third wiring pattern portion r3 and a main surface 1A on the mounting board 9 side of the IC chip 1 is longer than a distance H1 between the main surface 90 or the mounting board 9 and the main surface 1A of the IC chip 1.

The third wiring pattern portion r3 may be the second wiring pattern portion r2 or may be a wiring pattern portion other than the second wiring pattern portion r2. As shown in FIG. 2, the switch circuit 5 includes two third wiring pattern portions r3 included in the mounting board 9. In the high-frequency module 100, the entire one third wiring pattern portion r3 out of the two third wiring pattern portions r3 overlaps the IC chip 1 in plan view in the thickness direction D1 of the mounting board 9, and a part of another one third wiring pattern portion r3 overlaps the IC chip 1.

(2.2) Communication Device

As shown in FIG. 5, the communication device 300 includes the high-frequency module 100 and a signal processing circuit 301. The signal processing circuit 301 is connected to the high-frequency module 100.

The communication device 300 further includes the plurality of (for example, 3) antennas AN1, AN2, and AN3. The communication device 300 further includes a circuit board on which the high-frequency module 100 is mounted. The circuit board is, for example, a printed wiring board. The circuit board has a ground electrode to which a ground potential is applied.

The signal processing circuit 301 includes, for example, an RF signal processing circuit 302 and a baseband signal processing circuit 303. The RF signal processing circuit 302 is, for example, a radio frequency integrated circuit (RFIC) and performs signal processing on a high-frequency signal. The RF signal processing circuit 302 performs signal processing, such as upconversion, on the high-frequency signal (transmission signal) output from the baseband signal processing circuit 303, and outputs the high-frequency signal on which the signal processing is performed. In addition, the RF signal processing circuit 302 performs signal processing, such as downconversion, on the high-frequency signal (reception signal) output from the high-frequency module 100, and outputs the high-frequency signal on which the signal processing is performed to the baseband signal processing circuit 303. The baseband signal processing circuit 303 is, for example, a baseband integrated circuit (BBIC). The baseband signal processing circuit 303 generates an I-phase signal and a Q-phase signal from the baseband signal. The baseband signal is, for example, an audio signal, an image signal, and the like input from the outside. The baseband signal processing circuit 303 performs IQ modulation processing by combining the I-phase signal and the Q-phase signal, and outputs a transmission signal. In this case, the transmission signal is generated as a modulation signal (IQ signal) by amplitude modulation of a carrier wave signal of a predetermined frequency in a period longer than a period of the carrier wave signal. The reception signal processed by the baseband signal processing circuit 303 is used, for example, as an image signal for image display or as an audio signal for a call by the user of the communication device 300. The high-frequency module 100 transmits the high-frequency signal (the reception signal and the transmission signal) between the plurality of antennas AN1, AN2, and AN3 and the RF signal processing circuit 302 of the signal processing circuit 301.

The plurality of electronic components that configure the signal processing circuit 301 may be mounted on, for example, the above-described circuit board, or may be mounted on a circuit board (second circuit board) different from the circuit board (first circuit board) on which the high-frequency module 100 is mounted.

(3) Effect (3.1) High-Frequency Module

The high-frequency module 100 according to the exemplary embodiment includes the mounting board 9 and the IC chip 1. The mounting board 9 has a main surface 90. The IC chip 1 is disposed on the main surface 90 of the mounting board 9. The IC chip 1 includes a part of the switch circuit 5. The switch circuit 5 includes the plurality of common terminals 5A, 5B, and 5C, the plurality of selection terminals 51 to 57, the plurality of signal paths r11 to r13, r21 to r23, r31 to r33, r41 to r43, r51 to r53, r61 to r63, and r71 to r73. The plurality of selection terminals 51 to 57 are connectable to the plurality of common terminals 5A, 5B, and 5C. The plurality of signal paths r11 to r13, r21 to r23, r31 to r33, r41 to r43, r51 to r53, r61 to r63, and r71 to r73 include a plurality of switching elements Q11 to Q13, Q21 to Q23, Q31 to Q33, Q41 to Q43, Q51 to Q53, Q61 to Q63, and Q71 to Q73 that switches the connection form between the plurality of common terminals 5A, 5B, and 5C and the plurality of selection terminals 51 to 57. The plurality of common terminals 5A, 5B, and 5C, the plurality of selection terminals 51 to 57, and the plurality of switching elements Q11 to Q13, Q21 to Q23, Q31 to Q33, Q41 to Q43, Q51 to Q53, Q61 to Q63, and Q71 to Q73 of the switch circuit 5 are included in the IC chip 1. At least one signal path r0 among the plurality of signal paths r11 to r13, r21 to r23, r31 to r33, r41 to r43, r51 to r53, r61 to r63, and r71 to r73 of the switch circuit 5 includes the first wiring pattern portion r1 included in the IC chip 1, and the second wiring pattern portion r2 included in the mounting board 9.

According to the high-frequency module 100 according to the exemplary embodiment, it is possible to reduce the signal loss in the switch circuit 5. More specifically, in the high-frequency module 100, at least one signal path r0 includes a first wiring pattern portion r1 included in the IC chip 1 and a second wiring pattern portion r2 included in the mounting board 9, and accordingly, the wiring density in the IC chip 1 can be reduced, the wiring width of the signal path in the IC chip 1 can be enlarged, and the signal loss can be reduced. Further, in the high-frequency module 100, the wiring width WL2 of the second wiring pattern portion r2 can be set to be larger than the wiring width WL1 of the first wiring pattern portion r1, the thickness T2 of the second wiring pattern portion r2 can be set to be larger than the thickness T1 of the wiring pattern portion r1, and thus signal loss in the signal path r0 can be reduced.

Further, in the high-frequency module 100 according to the exemplary embodiment, the switch circuit 5 can simultaneously connect two or more selection terminals among the plurality of selection terminals 51 to 57 to one common terminal among the plurality of common terminals 5A, 5B, and 5C. The two or more selection terminals include a first selection terminal and a second selection terminal. The plurality of signal paths r11 to r13, r21 to r23, r31 to r33, r41 to r43, r51 to r53, r61 to r63, and r71 to r73 include a first signal path between the first selection terminal and the one common terminal and a second signal path between the second selection terminal and the one common terminal. At least one of the first signal path and the second signal path includes the first wiring pattern portion r1 and the second wiring pattern portion r2. Accordingly, in the high-frequency module 100 according to the exemplary embodiment, during simultaneous communication using the first signal path and the second signal path, the isolation between the first signal path and the second signal path can be improved, and it is possible to reduce signal leakage between the first signal path and the second signal path.

Further, in the high-frequency module 100 according to the exemplary embodiment, the IC chip 1 further includes the second switch circuit 6 different from the first switch circuit 5 which is the switch circuit 5. In the high-frequency module 100, at least a part of the signal path r67 that connects the first switch circuit 5 and the second switch circuit 6 includes the wiring pattern portion 67 on the mounting board 9. As a result, the high-frequency module 100 according to the exemplary embodiment can reduce the signal loss in the signal path r67 that connects the first switch circuit 5 and the second switch circuit 6. Further, in the high-frequency module 100 according to the exemplary embodiment, signal interference between the signal paths r11 to r13, r21 to r23, r31 to r33, r41 to r43, r51 to r53, and r61 to r63 of the first switch circuit 5 and the second switch circuit 6 connected to the signal paths r71 to r73 can be suppressed.

(3.2) Communication Device

Further, the communication device 300 according to the exemplary embodiment includes the high-frequency module 100 and the signal processing circuit 301. The signal processing circuit 301 is connected to the high-frequency module 100.

According to the communication device 300 according to the exemplary embodiment, it is possible to reduce the signal loss in the switch circuit 5.

(4) Modification Example of High-Frequency Module

The above exemplary embodiment is merely one of various exemplary embodiments of the present disclosure. Various modifications to the above exemplary embodiment are possible according to the design or the like as long as the object of the present disclosure can be achieved.

(4.1) Modification Example 1

Figure 10:
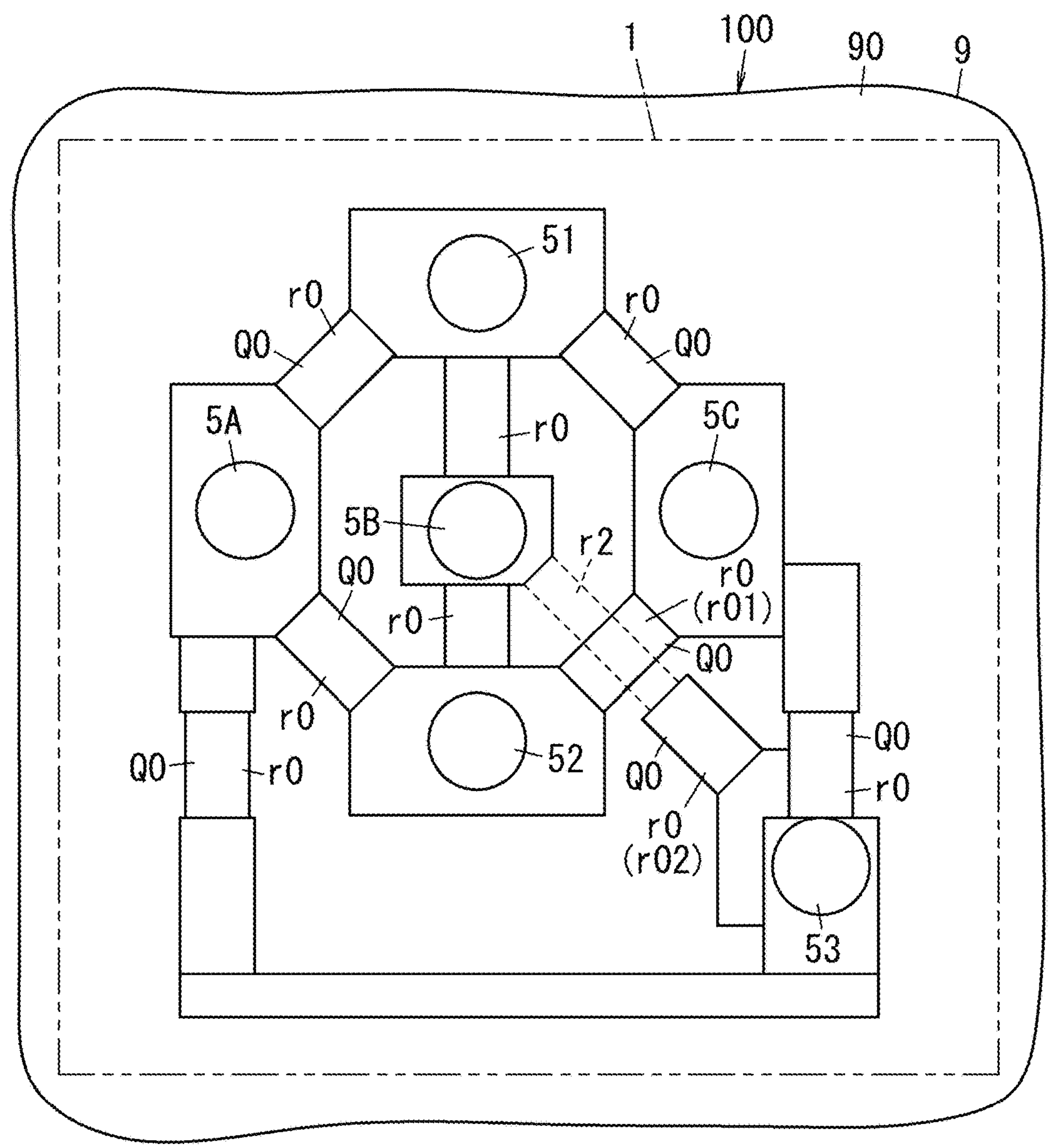
FIG. 10 is a schematic plan view of main portions of a high-frequency module according to Modification Example 1 of the exemplary embodiment.

In the high-frequency module 100 according to Modification Example 1 of the exemplary embodiment, as shown in FIG. 10, the switch circuit 5 includes three common terminals 5A, 5B, and 5C, three selection terminals 51 to 53, and the plurality of (9) signal path r0. The plurality of selection terminals 51 to 53 are connectable to the plurality of common terminals 5A, 5B, and 5C. The plurality of signal paths r0 include a plurality of switching elements Q0 that switch the connection form between the plurality of common terminals 5A, 5B, and 5C and the plurality of selection terminals 51 to 53. In the high-frequency module 100 according to Modification Example 1, when two signal paths r0 among the plurality of signal paths r0 that intersect with each other in plan view in the thickness direction D1 of the mounting board 9 (refer to FIG. 3) are defined as a first signal path r01 and a second signal path r02, the first part of the first signal path r01 that overlaps the second signal path r02 (in the example of FIG. 10, the switching element Q0 included in the signal path r0) is included in the IC chip 1, and the second part of the second signal path r02 that overlaps the first signal path r01 (a part of the second wiring pattern portion r2) is included in the mounting board 9.

Accordingly, in the high-frequency module 100 according to Modification Example 1, it is possible to improve the isolation between the first signal path r01 and the second signal path r02, and it is possible to reduce signal loss in each of the first signal path r01 and the second signal path r02.

(4.2) Modification Example 2

Figure 11:
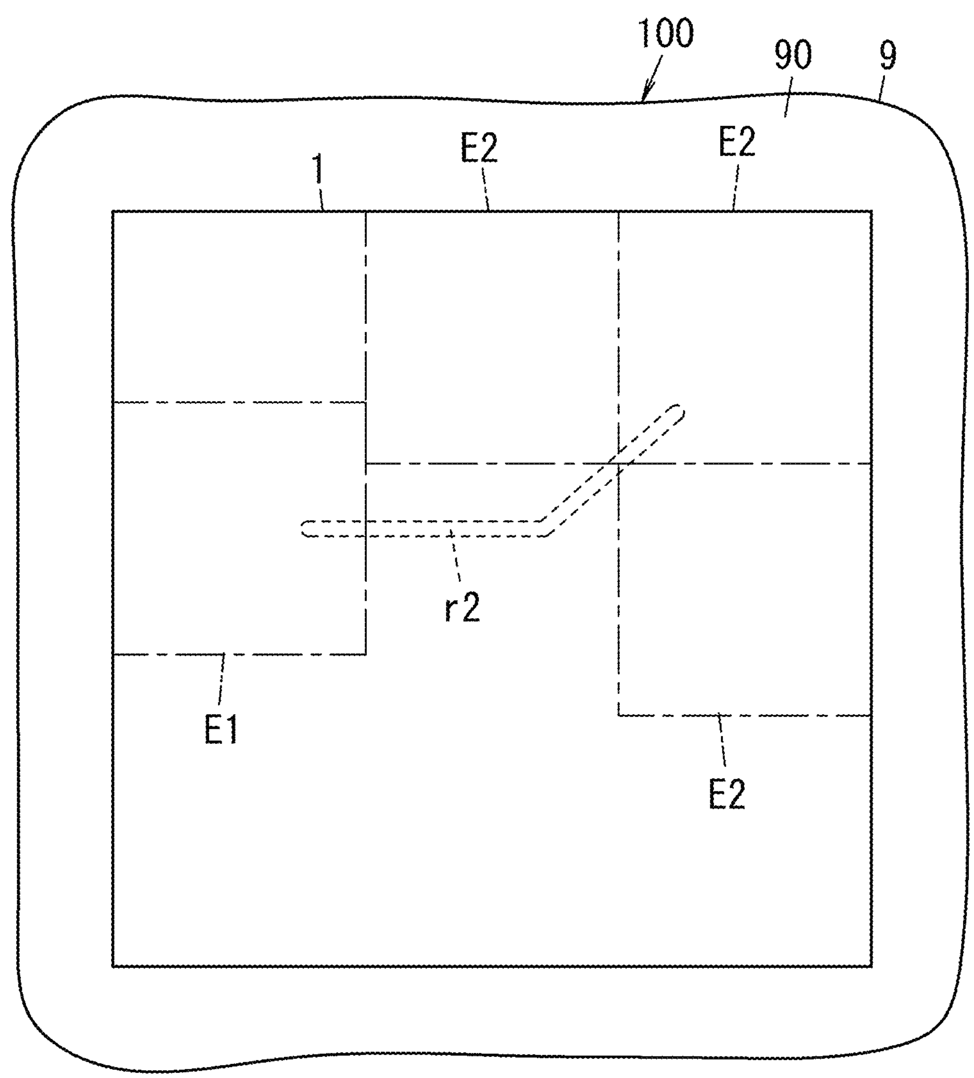
FIG. 11 is a schematic plan view of main portions of a high-frequency module according to Modification Example 2 of the exemplary embodiment.

Since the circuit configuration of the high-frequency module 100 according to Modification Example 2 is the same as the high-frequency module 100 according to Exemplary Embodiment 1 (refer to FIGS. 1 and 6), illustration and description will be omitted. In the high-frequency module 100 according to Modification Example 2, the signal path r0 having the maximum straight line distance between the common terminals 5A, 5B, and 5C (refer to FIG. 1) and the selection terminals (51 to 57) in plan view in the thickness direction D1 (refer to FIG. 3) of the mounting board 9 includes the second wiring pattern portion r2. In FIG. 11, with respect to the high-frequency module 100 according to Modification Example 2, one first region E1 and three second regions E2 of the IC chip 1 are schematically shown in plan view in the thickness direction D1 (refer to FIG. 3) of the mounting board 9. The first region E1 is a region where the common terminals 5A, 5B, and 5C and the plurality of switching elements Q1, Q2, and Q3 (refer to FIG. 1) are disposed. Each of the three second regions E2 is a region where one or more selection terminals among the plurality of selection terminals 51 to 57 and one or more pairs of the series switching element and the shunt switching element among the pairs of the plurality of series switching elements (in FIG. 1, the switching elements Q11 to Q13, Q21 to Q23, Q31 to Q33, Q41 to Q43, Q51 to Q53, Q61 to Q63, and Q71 to Q73) and the plurality of shunt switching elements (in FIG. 1, the switching elements Q10, Q20, Q30, Q40, Q50, Q60, and Q70) are disposed. The second wiring pattern portion r2 shown in FIG. 11 is the second wiring pattern portion r2 of the signal path r0 having the maximum straight line distance between the common terminals 5A, 5B, and 5C (refer to FIG. 1) and the selection terminals 51 to 57 (refer to FIG. 1) in plan view in the thickness direction D1 of the mounting board 9.

(4.3) Modification Example 3

Figure 12:
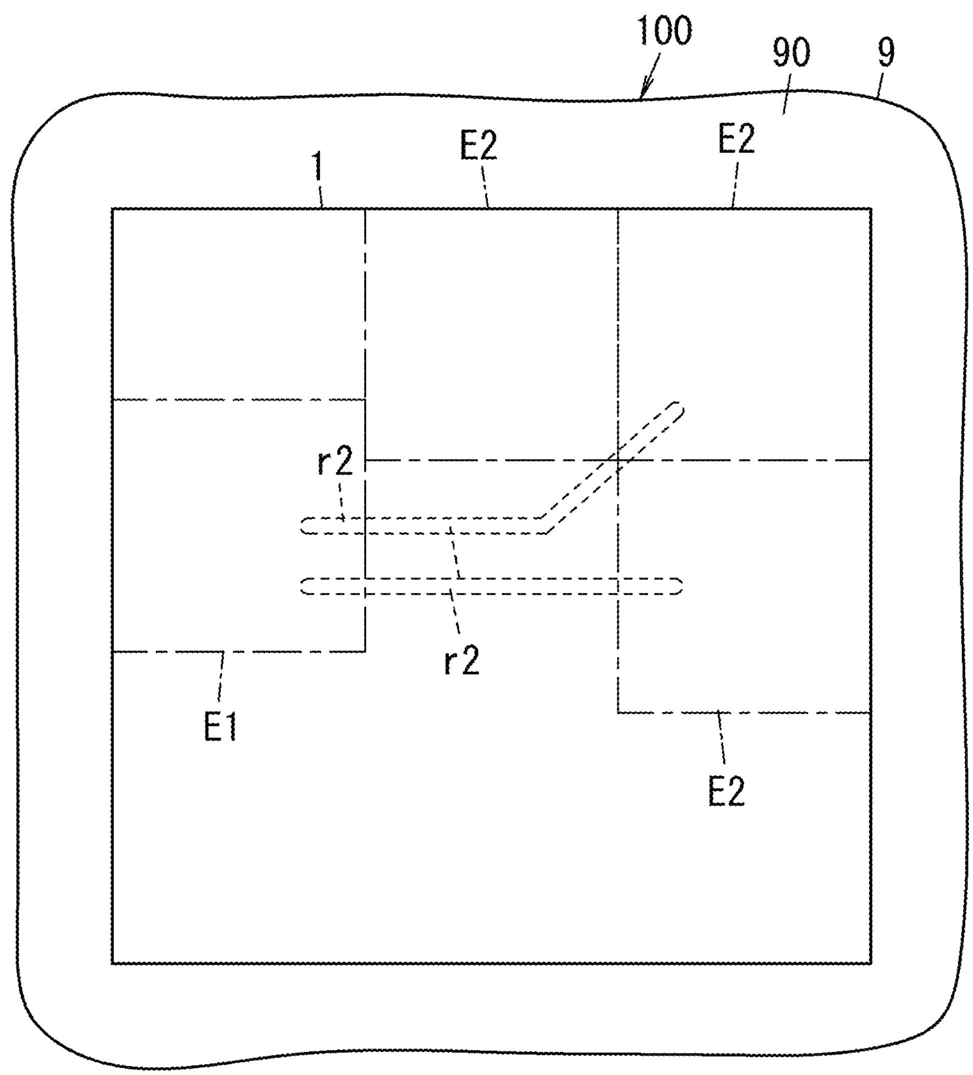
FIG. 12 is a schematic plan view of main portions of a high-frequency module according to Modification Example 3 of the exemplary embodiment.

Since the circuit configuration of the high-frequency module 100 according to Modification Example 3 is the same as the high-frequency module 100 according to Exemplary Embodiment 1 (refer to FIGS. 1 and 6), illustration and description will be omitted. Further, in FIG. 12, with respect to the high-frequency module 100 according to Modification Example 3, one first region E1 and three second regions E2 of the IC chip 1 are schematically shown in plan view in the thickness direction D1 (refer to FIG. 3) of the mounting board 9. The first region E1 is a region where the common terminals 5A, 5B, and 5C and the plurality of switching elements Q1, Q2, and Q3 are disposed. Each of the three second regions E2 is a region where one or more selection terminals among the plurality of selection terminals 51 to 57 and one or more pairs of the series switching element and the shunt switching element among the pairs of the plurality of series switching elements (the switching elements Q11 to Q13, Q21 to Q23, Q31 to Q33, Q41 to Q43, Q51 to Q53, Q61 to Q63, and Q71 to Q73) and the plurality of shunt switching elements (the switching elements Q10, Q20, Q30, Q40, Q50, Q60, and Q70) are disposed. One of the two second wiring pattern portions r2 shown in FIG. 12 is the second wiring pattern portion r2 in the signal path (first signal path) between the one common terminal and the first switching element connected to the first selection terminal that can be simultaneously connected to one common terminal among the three common terminals 5A, 5B, and 5C in the plurality of series switching elements. The remaining one of the two second wiring pattern portions r2 shown in FIG. 12 is the second wiring pattern portion r2 in the signal path (second signal path) between the one common terminal and the second switching element connected to the second selection terminal that can be simultaneously connected to the one common terminal in the plurality of series switching elements. A region (second region E2) where the first switching element is formed and a region (second region E2) where the second switching element is formed in the IC chip 1 in plan view in the thickness direction D1 of the mounting board 9 are adjacent to each other. Both a part of the first signal path between the one common terminal and the first switching element and a part of the second signal path between the one common terminal and the second switching element include the second wiring pattern portion r2 are included, but at least one may include the second wiring pattern portion r2.

(4.4) Modification Example 4

Figure 13:
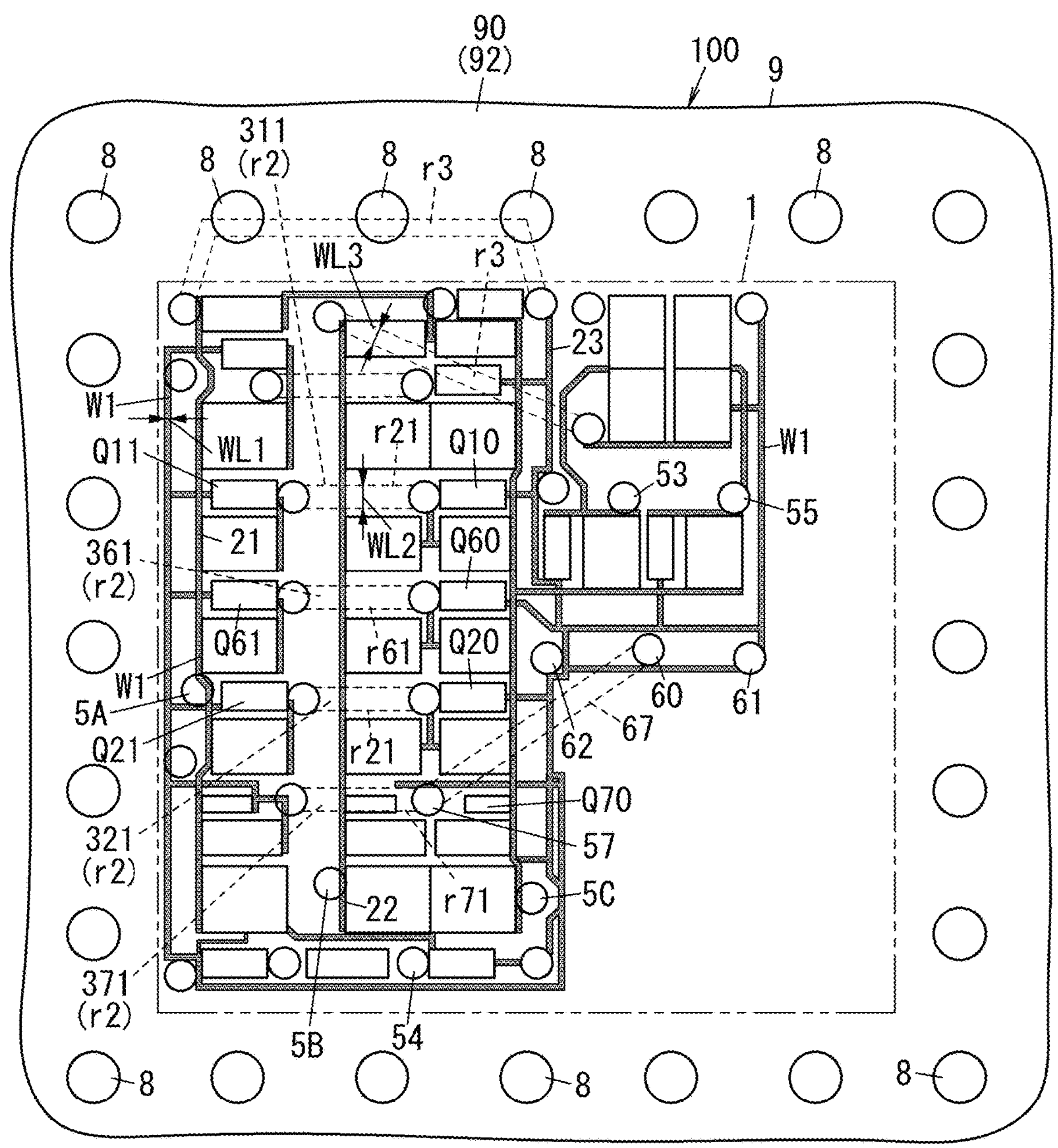
FIG. 13 is a plan view for describing the first wiring pattern portion, the second wiring pattern portion, and the third wiring pattern portion in a high-frequency module according to Modification Example 4 of the exemplary embodiment.

Hereinafter, the high-frequency module 100 according to Modification Example 4 will be described based on FIG. 13. Regarding the high-frequency module 100 according to Modification Example 4, the same constituent elements as the high-frequency module 100 (refer to FIGS. 1 to 9) according to Exemplary Embodiment 1 will be given the same reference numerals, and the description thereof will be omitted.

The high-frequency module 100 according to Modification Example 4 is different from the high-frequency module 100 according to Exemplary Embodiment 1 in that some external connection terminals 8 among the plurality of external connection terminals 8 disposed on the second main surface 92 of the mounting board 9 are positioned along the outer edge of the IC chip 1 in plan view in the thickness direction D1 (refer to FIG. 9) of the mounting board 9. In addition, FIG. 13 shows only some of the external connection terminals 8 among the plurality of external connection terminals 8.

In the high-frequency module 100 according to Modification Example 4, a part of one third wiring pattern portion r3 (for example, a part between the first end and the second end of the third wiring pattern portion r3) out of the two third wiring pattern portions r3 does not overlap the IC chip 1 in plan view in the thickness direction D1 of the mounting board 9. Accordingly, the high-frequency module 100 according to Modification Example 4 can suppress the coupling between the wiring portion W1 of the IC chip 1 and the third wiring pattern portion r3, and the signal loss in the switch circuit 5 (refer to FIG. 7) can be further reduced. Further, in the high-frequency module 100 according to Modification Example 4, it is possible to reduce the area of the IC chip 1 in plan view in the thickness direction D1 of the mounting board 9, or to reduce the number of layers of the multilayer structure portion 15 (refer to FIG. 4) of the IC chip 1. In addition, in the high-frequency module 100 according to Modification Example 4, in plan view in the thickness direction D of the mounting board 9, a part of the third wiring pattern portion r3 overlaps a predetermined number (in the example of FIG. 13, 3) of external connection terminals 8 among the plurality of external connection terminals 8. In addition, the external connection terminal 8 on which a part of the third wiring pattern portion r3 overlaps in plan view in the thickness direction D1 of the mounting board 9 is preferably the ground terminal 85.

(4.5) Modification Example 5

Figure 14:
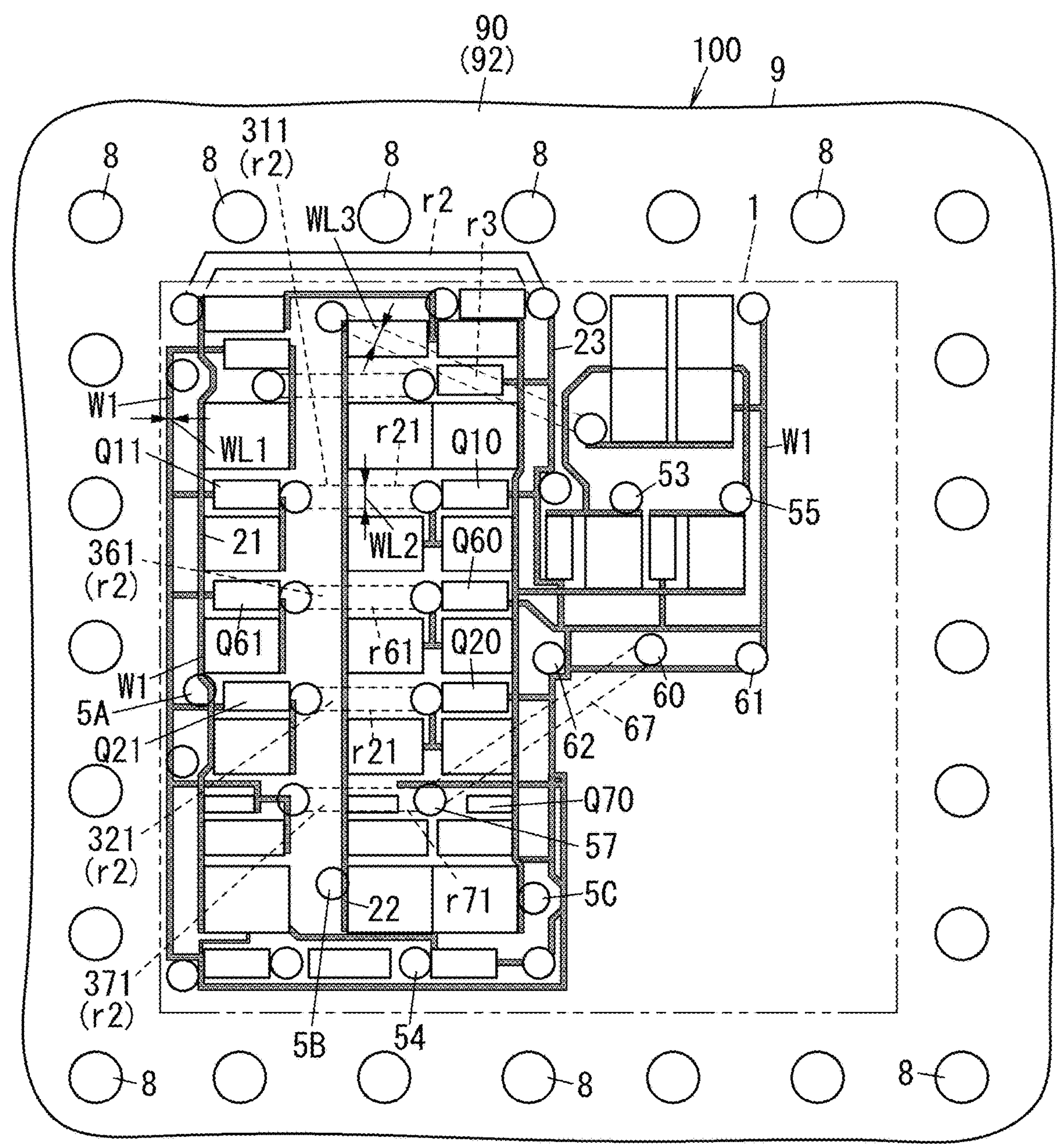
FIG. 14 is a plan view for describing the first wiring pattern portion, the second wiring pattern portion, and the third wiring pattern portion in a high-frequency module according to Modification Example 5 of the exemplary embodiment.

Hereinafter, the high-frequency module 100 according to Modification Example 5 will be described based on FIG. 14. Regarding the high-frequency module 100 according to Modification Example 5, the same constituent elements as the high-frequency module 100 (refer to FIGS. 1 to 9) according to Exemplary Embodiment 1 will be given the same reference numerals, and the description thereof will be omitted.

The high-frequency module 100 according to Modification Example 5 is different from the high-frequency module 100 according to Exemplary Embodiment 1 in that some external connection terminals 8 among the plurality of external connection terminals 8 disposed on the second main surface 92 of the mounting board 9 are positioned along the outer edge of the IC chip 1 in plan view in the thickness direction D1 (refer to FIG. 9) of the mounting board 9. In addition, FIG. 14 shows only some of the external connection terminals 8 among the plurality of external connection terminals 8.

In the high-frequency module 100 according to Modification Example 5, a part of one second wiring pattern portion r2 (for example, a part between the first end and the second end of the second wiring pattern portion r2) among the plurality of second wiring pattern portions r2 does not overlap the IC chip 1 in plan view in the thickness direction D1 of the mounting board 9. Accordingly, the high-frequency module 100 according to Modification Example 5 can suppress the coupling between the wiring portion W1 of the IC chip 1 and the second wiring pattern portion r2, and the signal loss in the switch circuit 5 (refer to FIG. 7) can be further reduced. Further, in the high-frequency module 100 according to Modification Example 5, it is possible to reduce the area of the IC chip 1 in plan view in the thickness direction D1 of the mounting board 9, or to reduce the number of layers of the multilayer structure portion 15 (refer to FIG. 3) of the IC chip 1. In addition, in the high-frequency module 100 according to Modification Example 5, a part of the second wiring pattern portion r2 overlaps the region where the plurality of external connection terminals 8 are disposed in plan view in the thickness direction D1 of the mounting board 9. Further, the high-frequency module 100 according to Modification Example 5 may include at least the second wiring pattern portion r2 having a part that does not overlap the IC chip 1 in plan view in the thickness direction D1 of the mounting board 9 among the plurality of second wiring pattern portions r2.

(4.6) Other Modification Examples

In the high-frequency module 100, the IC chip 1 may be configured such that the IC chip 1 does not include the control circuit 17, and the first switch circuit 5 and the second switch circuit 6 is directly controlled by the signal processing circuit 301.

Further, in the high-frequency module 100, each of the plurality of switching elements Q11 to Q13, Q21 to Q23, Q31 to Q33, Q41 to Q43, Q51 to Q53, Q61 to Q63, and Q71 to Q73 is not limited to the FET, and for example, may be a bipolar transistor or a CMOS switch.

Further, each of the plurality of filters F0 is not limited to the case of being a surface acoustic wave filter, but may be a bulk acoustic wave filter. In the bulk acoustic wave filter, each of the plurality of acoustic wave resonators is a BAW resonator. The BAW resonator is, for example, a film bulk acoustic resonator (FBAR) or a solidly mounted resonator (SMR). Further, each of the plurality of filters F0 may be, for example, an acoustic wave filter that uses a boundary acoustic wave, a plate wave, or the like.

Each of the plurality of external connection terminals 8 is not limited to the case of being a columnar electrode, and may be, for example, a ball-shaped bump. A material of the ball-shaped bump that configures each of the plurality of external connection terminals 8 is, for example, gold, copper, solder, and the like.

Further, the high-frequency module 100 has a configuration in which a plurality of second circuit components are mounted on the first main surface 91 of the mounting board 9 rather than the second main surface 92, and need not include the second resin layer 210. In this case, the main surface 90 on which the IC chip 1 is disposed on the mounting board 9 is the first main surface 91 of the mounting board 9.

The circuit configuration of the high-frequency module 100 is not limited to the example in FIG. 6 described above. Further, the high-frequency module 100 may include at least the mounting board 9 and the IC chip 1.

In addition, the high-frequency module 100 is not limited to the transmission and reception module including the transmitting system electronic component and the receiving system electronic component, may be the transmission module including only a transmitting system electronic component out of the transmitting system electronic component and the receiving system electronic component, or may be a receiving module including only a receiving system electronic component out of the transmitting system electronic component and the receiving system electronic component.

(Aspect)

The following aspects are disclosed in the present specification.

A high-frequency module (100) according to a first aspect includes a mounting board (9) and an IC chip (1). The mounting board (9) has a main surface (90). The IC chip (1) is disposed on the main surface (90) of the mounting board (9). The IC chip (1) includes a part of the switch circuit (5). The switch circuit (5) includes the plurality of common terminals (5A, 5B, 5C), the plurality of selection terminals (51 to 57), the plurality of signal paths (r11 to r13, r21 to r23, r31 to r33, r41 to r43, r51 to r53, r61 to r63, r71 to r73). The plurality of selection terminals (51 to 57) are connectable to the plurality of common terminals (5A, 5B, 5C). The plurality of signal paths (r11 to r13, r21 to r23, r31 to r33, r41 to r43, r51 to r53, r61 to r63, r71 to r73) include a plurality of switching elements (Q11 to Q13, Q21 to Q23, Q31 to Q33, Q41 to Q43, Q51 to Q53, Q61 to Q63, Q71 to Q73) that switches the connection form between the plurality of common terminals (5A, 5B, 5C) and the plurality of selection terminals (51 to 57). The plurality of common terminals (5A, 5B, 5C), the plurality of selection terminals (51 to 57), and the plurality of switching elements (Q11 to Q13, Q21 to Q23, Q31 to Q33, Q41 to Q43, Q51 to Q53, Q61 to Q63, Q71 to Q73) of the switch circuit (5) are included in the IC chip 1. At least one signal path (r0) among the plurality of signal paths (r11 to r13, r21 to r23, r31 to r33, r41 to r43, r51 to r53, r61 to r63, r71 to r73) of the switch circuit (5) includes the first wiring pattern portion (r1) included in the IC chip (1), and the second wiring pattern portion (r2) included in the mounting board (9).

In the high-frequency module (100) according to the first aspect, it is possible to reduce the signal loss in the switch circuit (5).

In the high-frequency module (100) according to the second aspect, in the first aspect, the switch circuit (5) can simultaneously connect two or more selection terminals among the plurality of selection terminals (51 to 57) to one common terminal among the plurality of common terminals (5A, 5B, 5C). The two or more selection terminals include a first selection terminal and a second selection terminal. The plurality of signal paths (r11 to r13, r21 to r23, r31 to r33, r41 to r43, r51 to r53, r61 to r63, r71 to r73) include a first signal path between the first selection terminal and the one common terminal and the second signal path between the second selection terminal and the one common terminal. At least one of the first signal path and the second signal path includes the first wiring pattern portion (r1) and the second wiring pattern portion (r2).

According the high-frequency module (100) according to the second aspect, the isolation between the first signal path and the second signal path can be improved, and it is possible to reduce signal leakage between the first signal path and the second signal path.

In the high-frequency module (100) according to the third aspect, in the second aspect, the first signal path and the second signal path intersect with each other in plan view in the thickness direction (D1) of the mounting board (9). The first part that overlaps the second signal path in the first signal path is included in the IC chip (1), and the second part that overlaps the first signal path in the second signal path is included in the mounting board (9).

In the high-frequency module (100) according to the third aspect, when the first signal path and the second signal path intersect with each other in plan view in the thickness direction (D1) of the mounting board (9), the isolation between the first signal path and the second signal path can be improved, and signal leakage between the first signal path and the second signal path can be reduced.

In the high-frequency module (100) according to the fourth aspect, in the second aspect, the plurality of switching elements (Q11 to Q13, Q21 to Q23, Q31 to Q33, Q41 to Q43, Q51 to Q53, Q61 to Q63, Q71 to Q73) includes a first switching element connected to a first selection terminal and a second switching element connected to a second selection terminal. A region where the first switching element is formed and a region where the second switching element is formed in the IC chip (1) in plan view in the thickness direction (D1) of the mounting board (9) are adjacent to each other. One of a part of the first signal path between the one common terminal and the first switching element and a part of the second signal path between the one common terminal and the second switching element include the second wiring pattern portion (r2).

In the high-frequency module (100) according to the fourth aspect, the isolation between the first signal path and the second signal path can be improved.

In the high-frequency module (100) according to the fifth aspect, in any one of the first to fourth aspects, a plurality of conductive bumps (19) are further provided. The plurality of conductive bumps (19) connect the mounting board (9) to the plurality of common terminals (5A, 5B, 5C) and the plurality of selection terminals (51 to 57) of the IC chip (1). The second wiring pattern portion (r2) overlaps the IC chip (1) in plan view in the thickness direction (D1) of the mounting board (9).

In the high-frequency module (100) according to the fifth aspect, it is possible to suppress a case where the exclusive area of the switch circuit (5) is larger than the area of the IC chip (1) in plan view in the thickness direction (D1) of the mounting board (9).

In the high-frequency module (100) according to the sixth aspect, in the first aspect, the at least one signal path (r0) is a signal path having the maximum straight line distance between the common terminals (5A, 5B, 5C) and the selection terminal (51 to 57) in plan view in the thickness direction (D1) of the mounting board (9) among the plurality of signal paths (r11 to r13, r21 to r23, r31 to r33, r41 to r43, r51 to r53, r61 to r63, and r71 to r73).

In the high-frequency module (100) according to the sixth aspect, it is possible to reduce loss in the signal path having the maximum straight line distance between the common terminals (5A, 5B, 5C) and the selection terminal (51 to 57) in plan view in the thickness direction (D1) of the mounting board (9) among the plurality of signal paths (r11 to r13, r21 to r23, r31 to r33, r41 to r43, r51 to r53, r61 to r63, r71 to r73).

In the high-frequency module (100) according to the seventh aspect, in the first aspect, the plurality of common terminals (5A, 5B, 5C) include three common terminals (5A, 5B, 5C). The plurality of selection terminals (51 to 57) include three or more selection terminals (51 to 57). When the two signal paths (r0) that intersect with each other in plan view in the thickness direction (D1) of the mounting board (9) among the plurality of signal paths (r0; r11 to r13, r21 to r23, r31 to r33, r41 to r43, and r51 to r53, r61 to r63, r71 to r73) are defined as a first signal path (r01) and a second signal path (r02), the first part (first wiring pattern portion r1) that overlaps the second signal path (r02) in the first signal path (r01) is included in the IC chip (1), and the second part (second wiring pattern portion r2) that overlaps the first signal path (r01) in the second signal path (r02) is Included in the mounting board (9).

In the high-frequency module (100) according to the seventh aspect, the isolation between the first signal path (r01) and the second signal path (r02) can be improved.

In the high-frequency module (100) according to the eighth aspect, in any one of the first to seventh aspects, the IC chip (1) further includes the second switch circuit (6) separated from the first switch circuit (5) which is the switch circuit (5). At least a part of the signal path (r67) that connects the first switch circuit (5) and the second switch circuit (6) includes the wiring pattern portion (67) on the mounting board (9).

In the high-frequency module (100) according to the eighth aspect can reduce the signal loss in the signal path (r67) that connects the first switch circuit (5) and the second switch circuit (6). Further, in the high-frequency module (100) according to the eighth aspect, it is possible to suppress the signal interference between the first switch circuit (5) and the second switch circuit (6).

In the high-frequency module (100) according to the ninth aspect, in any one of the first to eighth aspects, the surface (Sr2) on the IC chip (1) side of the second wiring pattern portion (r2) includes a part of the main surface (90) of the mounting board (9).

In the high-frequency module (100) according to the tenth aspect, in any one of the first to ninth aspects, the switch circuit (5) includes the third wiring pattern portion (r3) included in the mounting board (9). The distance (H3) between the third wiring pattern portion (r3) and the main surface (90) on the mounting board (9) side in the IC chip (1) is longer than the distance (H1) between the main surface (90) of the mounting board (9) and the main surface (1A) on the mounting board (9) side in the IC chip (1).

In the high-frequency module (100) according to the tenth aspect, for example, it is possible to improve the isolation between the power wiring portion in the IC chip (1) and the third wiring pattern portion (r3).

In the high-frequency module (100) according to the eleventh aspect, in the tenth aspect, the mounting board (9) includes the first main surface (91) facing the second main surface (92) which is the main surface (90) of the mounting board (9). The high-frequency module (100) further includes electronic components (the receiving system electronic component 4, the transmitting system electronic component, the inductors L1, L3, L7, L11, L25, L30, L32, L34, L39, L40, L41, L53, L66) disposed on the first main surface (91) of the mounting board (9), and a plurality of external connection terminals (8) disposed on the second main surface (92) of the mounting board (9). A part of at least one of the second wiring pattern portion (r2) and the third wiring pattern portion (r3) does not overlap the IC chip (1) in plan view in the thickness direction (D1) of the mounting board (9).

In the high-frequency module (100) according to the eleventh aspect, it is possible to reduce the signal loss in the switch circuit (5).

The communication device (300) according to the twelfth aspect includes the high-frequency module (100) according to any one of the first to eleventh aspects, and the signal processing circuit (301). The signal processing circuit (301) is connected to the high-frequency module (100).

According to the communication device (300) according to the twelfth aspect, it is possible to reduce the signal loss in the switch circuit (5).

REFERENCE SIGNS LIST

1 IC chip
1A Main surface
10 Silicon substrate
10A First main surface
10B Second main surface
11 to 13 Common wiring portion
15 Multilayer structure portion
16 Pad electrode
17 Control circuit
18 Circuit portion
19 Conductive bump
21 to 23 First wiring portion
31 to 37 Second wiring portion
38, 39 Wiring portion
2, 2A, 2B, 2C, 2D First switch
3, 3A, 3B, 3C, 3D Second switch
4 Receiving system electronic component
41 to 46 Receiving system electronic component
401 Main surface
402 Main surface
403 Outer peripheral surface
5 Switch circuit (first switch circuit)
5A, 5B, 5C Common terminal
51 to 57 Selection terminal
6 Second switch circuit
60 Common terminal
61, 62 Selection terminal
67 Wiring pattern portion
7 Switch
8 External connection terminal
81A, 81B, 81C Antenna terminal
82A, 82B, 82C, 82D Signal output terminal
83A, 83B Signal input terminal
84 Control terminal
85 Ground terminal
9 Mounting board
90 Main surface
91 First main surface
92 Second main surface
93 Outer peripheral surface
100 High-frequency module
101 Receiving circuit
102 Transmitting circuit
110 IC chip
111, 112 Amplifier
113A, 113B Power amplifier
114 Switch
117 Switch
121, 122 Transformer
131, 132 Output matching circuit
161, 162, 163 Matching circuit
190 Resin layer (first resin layer)
191 Main surface
193 Outer peripheral surface
200 Metal electrode layer
210 Second resin layer
213 Outer peripheral surface
300 Communication device
301 Signal processing circuit
302 RF signal processing circuit
303 Baseband signal processing circuit
AN1, AN2, AN3 Antenna
A1, A3, A7, A11, A25, A30, A32, A34, A39, A40, A41, A53, A66 Low-noise amplifier
D1 Thickness direction
L1, L3, L7, L11, L25, L30, L32, L34, L39, L40, L41, L53, L66 Inductor
F0 Filter
F1R, F3, F7, F11, F25, F30, F32, F34, F39, F40, F41R, F53, F66R Receive filter
F1T, F3T, F41T, F66T Transmission filter
H1 Distance
H3 Distance
Q10, Q20, Q30, Q40, Q50, Q60, Q70 Switching element (shunt switching element)
Q11 to Q13 Switching element (series switching element)
Q21 to Q23 Switching element (series switching element)
Q31 to Q33 Switching element (series switching element)
Q41 to Q43 Switching element (series switching element)
Q51 to Q53 Switching element (series switching element)
Q61 to Q63 Switching element (series switching element)
Q71 to Q73 Switching element (series switching element)
Q80 Switching element (shunt switching element)
Q81 Switching element (series switching element)
Q90 Switching element (shunt switching element)
Q91 Switching element (series switching element)
r0 Signal path
r01 First signal path
r02 Second signal path
r1 First wiring pattern portion
r2 Second wiring pattern portion
r3 Third wiring pattern portion
r11 to r13 Signal path
r21 to r23 Signal path
r31 to r33 Signal path
r41 to 43 Signal path
r51 to 53 Signal path
r51 to 53 Signal path r61 to 63 Signal path
r67 Signal path
r71 to 73 Signal path
Sr2 Surface
T1 Thickness
T2 Thickness
T3 Thickness
W1 Wiring portion
WL1 Wiring width
WL2 Wiring width
WL3 Wiring width

The invention claimed is:

1. A high-frequency module comprising:

a mounting board having a main surface; and an IC chip that is disposed on the main surface of the mounting board, and includes a part of a switch circuit, wherein the switch circuit includes:

a plurality of common terminals, a plurality of selection terminals that are connectable to the plurality of common terminals, and a plurality of signal paths including a plurality of switching elements that switch a connection form between the plurality of common terminals and the plurality of selection terminals, the plurality of common terminals, the plurality of selection terminals, and the plurality of switching elements of the switch circuit are included in the IC chip, and at least one signal path among the plurality of signal paths of the switch circuit includes:

a first wiring pattern portion included in the IC chip, and a second wiring pattern portion included in the mounting board, and wherein the switch circuit is configured to simultaneously connect two or more selection terminals among the plurality of selection terminals to one common terminal among the plurality of common terminals, the two or more selection terminals include:

a first selection terminal, and a second selection terminal, the plurality of signal paths include:

a first signal path between the first selection terminal and the one common terminal, and a second signal path between the second selection terminal and the one common terminal and at least one of the first signal path and the second signal path includes the first wiring pattern portion and the second wiring pattern portion.

2. The high-frequency module according to claim 1, wherein the first signal path and the second signal path intersect with each other in plan view in a thickness direction of the mounting board, and a first part of the first signal path that overlaps the second signal path is included in the IC chip, and a second part of the second signal path that overlaps the first signal path is included in the mounting board.

3. The high-frequency module according to claim 1, wherein the plurality of switching elements include:

a first switching element that is connected to the first selection terminal, and a second switching element that is connected to the second selection terminal, a region where the first switching element is formed and a region where the second switching element is formed are adjacent to each other in the IC chip in plan view in a thickness direction of the mounting board, and one of a part between the one common terminal and the first switching element in the first signal path and a part between the one common terminal and the second switching element in the second signal path includes the second wiring pattern portion.

4. The high-frequency module according to claim 1, further comprising:

a plurality of conductive bumps that connect the mounting board to the plurality of common terminals and the plurality of selection terminals of the IC chip, wherein the second wiring pattern portion overlaps the IC chip in plan view in a thickness direction of the mounting board.

5. The high-frequency module according to claim 1, wherein the at least one signal path is a signal path having a maximum straight line distance between the common terminal and the selection terminal in plan view in a thickness direction of the mounting board among the plurality of signal paths.

6. The high-frequency module according to claim 1, wherein the plurality of common terminals include three common terminals, the plurality of selection terminals include three or more selection terminals, and when two signal paths intersecting with each other in plan view in a thickness direction of the mounting board among the plurality of signal paths are defined as a first signal path and a second signal path, a first part of the first signal path that overlaps the second signal path is included in the IC chip, and a second part of the second signal path that overlaps the first signal path is included in the mounting board.

7. The high-frequency module according to claim 1, wherein the IC chip further includes a second switch circuit different from the switch circuit, and at least a part of a signal path that connects the first switch circuit and the second switch circuit to each other includes a wiring pattern portion on the mounting board.

8. The high-frequency module according to claim 1, wherein a surface of the second wiring pattern portion on an IC chip side is a part of the main surface of the mounting board.

9. The high-frequency module according to claim 1, wherein the switch circuit includes a third wiring pattern portion included in the mounting board, and a distance between the third wiring pattern portion and a main surface of the IC chip on a mounting board side is longer than a distance between the main surface of the mounting board and the main surface of the IC chip on the mounting board side.

10. The high-frequency module according to claim 9, wherein the mounting board includes a first main surface facing a second main surface which is the main surface of the mounting board, the high-frequency module further comprises:

an electronic component disposed on the first main surface of the mounting board; and a plurality of external connection terminals disposed on the second main surface of the mounting board, and a part of at least of the second wiring pattern portion and the third wiring pattern portion does not overlap the IC chip in plan view in a thickness direction of the mounting board.

11. A communication device comprising:

the high-frequency module according to claim 1; and a signal processing circuit connected to the high-frequency module.

12. The high-frequency module according to claim 1, wherein the main board is formed of a low-temperature co-fired ceramic (LTCC).

13. The high-frequency module according to claim 1, wherein the main board is formed of a high-temperature co-fired ceramic (HTCC).

14. The high-frequency module according to claim 1, wherein the main board is formed of a multilayer resin substrate.

15. The high-frequency module according to claim 1, wherein the switch circuit is formed, at least in part, by one or more field effect transistors (FETs).

16. The high-frequency module according to claim 1, wherein the switch circuit is formed, at least in part, by one or more CMOS switches.

17. The high-frequency module according to claim 1, wherein the switch circuit is formed, at least in part, by one or more bipolar transistors.

18. The high-frequency module according to claim 1, wherein the IC chip further includes a silicon substrate.

19. The high-frequency module according to claim 18, wherein the part of the switch circuit included in the IC chip is formed on the silicon substrate.

* * * * *